United States Patent
Miyaoka

(10) Patent No.: US 10,014,909 B2
(45) Date of Patent: *Jul. 3, 2018

(54) COMMUNICATION DEVICE, COMMUNICATION METHOD, AND COMMUNICATION SYSTEM

(71) Applicant: Sony Semiconductor Solutions Corporation, Kanagawa (JP)

(72) Inventor: Hirosada Miyaoka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 69 days.

This patent is subject to a terminal disclaimer.

(21) Appl. No.: 15/096,460

(22) Filed: Apr. 12, 2016

(65) Prior Publication Data

US 2016/0226559 A1  Aug. 4, 2016

Related U.S. Application Data

(63) Continuation of application No. 14/638,644, filed on Mar. 4, 2015, now Pat. No. 9,378,110.

(30) Foreign Application Priority Data

Mar. 25, 2014  (JP) .................. 2014-061281

(51) Int. Cl.
*H04B 3/52* (2006.01)
*G06F 11/30* (2006.01)
(Continued)

(52) U.S. Cl.
CPC .......... *H04B 3/52* (2013.01); *G06F 11/3041* (2013.01); *G06F 11/3051* (2013.01);
(Continued)

(58) Field of Classification Search
CPC ... H04B 3/52; G06F 13/4282; G06F 11/3041; G06F 11/3051; G06F 11/3062; G06F 13/385; H04L 25/0276
See application file for complete search history.

(56) References Cited

U.S. PATENT DOCUMENTS 6,603,744 B2  8/2003  Mizutani et al.
6,912,651 B1  6/2005  Hamdi et al.
(Continued)

FOREIGN PATENT DOCUMENTS

JP  11-017748  1/1999
JP  H11-112524 A  4/1999
(Continued)

OTHER PUBLICATIONS

Skyworks "Automatic Detection of USB Port vs Wall Adapter Power", Mar. 19, 2013, pp. 1-5.*
(Continued)

*Primary Examiner* — Sophia Vlahos
(74) *Attorney, Agent, or Firm* — Michael Best & Friedrich LLP

(57) ABSTRACT

There is provided a communication device including a transmission unit configured to transmit a modulated signal obtained by performing frequency conversion to convert a baseband signal output by a first electronic device into a signal with a higher frequency band than the baseband signal, using a waveguide as a transmission path, and a detection target mechanism corresponding to a mechanism included in a second electronic device that receives the baseband signal output by the first electronic device, the detection target mechanism being configured to be connected to the first electronic device and to be detected by the first electronic device when the first electronic device and the second electronic device are connected.

23 Claims, 19 Drawing Sheets

(51) Int. Cl.
*G06F 13/38* (2006.01)
*H04L 25/02* (2006.01)
*G06F 13/42* (2006.01)

(52) U.S. Cl.
CPC ........ *G06F 11/3062* (2013.01); *G06F 13/385* (2013.01); *G06F 13/4282* (2013.01); *H04L 25/0276* (2013.01); *Y02D 10/14* (2018.01); *Y02D 10/151* (2018.01)

(56) References Cited

U.S. PATENT DOCUMENTS

| | | | |
|---|---|---|---|
| 7,610,410 B2 | 10/2009 | Uehara | |
| 7,886,104 B2 | 2/2011 | Lai et al. | |
| 8,055,831 B2 | 11/2011 | Choi et al. | |
| 9,378,110 B2* | 6/2016 | Miyaoka | G06F 11/3041 |
| 2003/0070103 A1 | 4/2003 | Kim | |
| 2006/0179144 A1 | 8/2006 | Nagase | |
| 2008/0320180 A1 | 12/2008 | Manabe | |
| 2009/0221259 A1* | 9/2009 | Shiramizu | H03D 7/1433 |
| | | | 455/334 |
| 2010/0138572 A1 | 6/2010 | Rofougaran | |
| 2011/0043162 A1* | 2/2011 | Lee | H02J 7/0077 |
| | | | 320/107 |
| 2011/0064023 A1 | 3/2011 | Yamamoto et al. | |
| 2011/0320837 A1 | 12/2011 | Suematsu | |
| 2012/0030400 A1* | 2/2012 | Kim | G06F 13/4072 |
| | | | 710/313 |
| 2012/0265913 A1* | 10/2012 | Suumaki | H04W 4/008 |
| | | | 710/303 |
| 2013/0010849 A1 | 1/2013 | Shimizu et al. | |
| 2013/0266026 A1 | 10/2013 | McCormack et al. | |

FOREIGN PATENT DOCUMENTS

| | | |
|---|---|---|
| JP | 2007-088775 A | 4/2007 |
| JP | 2008-061144 A | 3/2008 |
| JP | 2012-008716 | 1/2012 |
| WO | WO-2015/056581 A1 | 4/2015 |

OTHER PUBLICATIONS

Machine language translation of JP-2007-088775-A.*
Japanese Office Action dated Dec. 6, 2016 for corresponding Japanese Application No. 2014-061281.
Asakura et al., "Prototype of 3-Gb/s 60-GHz Millimeter—wave-based—Wireless file-Transfer System, Electromagnetic Theory (EMTS)" Proceedings of 2013 URSI International Symposium on May 20, 2013.

* cited by examiner

COMMUNICATION DEVICE, COMMUNICATION METHOD, AND COMMUNICATION SYSTEM

CROSS REFERENCE TO RELATED APPLICATIONS

This is a Continuation of application Ser. No. 14/638,644, filed on Mar. 4, 2015, which contains subject matter related to Japanese Priority Patent Application JP 2014-061281 filed Mar. 25, 2014, the entire contents of which are incorporated herein by reference.

BACKGROUND

The present technology relates a communication device and a control method, and particularly, to a communication device and a control method capable of increasing, for example, variations of connection forms between electronic devices such as a Universal Serial Bus (USB) host and a USB device conforming to a USB standard.

For example, as the electronic devices conforming to a USB standard, there are a USB host (an electronic device serving as the USB host) and a USB device (an electronic device serving as the USB device).

The USB host and the USB device are connected using, for example, a USB cable. The USB host initiatively controls communication between the USB host and the USB device.

The USB standard corresponds to bus power (powered). Through the USB cable, power can be supplied from the USB host to the USB device in addition to a signal (data).

However, in the USB standard, an upper limit is defined for a current which can be supplied as power through one USB cable. Accordingly, technologies for supplying power from a USB host to a USB device of which a consumption current exceeds the upper limit defined in the USB standard have been proposed (for example, see JP 2012-008716A).

SUMMARY

Incidentally, requests for increasing variations of connection forms in regard to connection between electronic devices have been made.

It is desirable to provide a technology for increasing variations of connection forms between electronic devices.

According to an embodiment of the present disclosure, there is provided a communication device including a transmission unit configured to transmit a modulated signal obtained by performing frequency conversion to convert a baseband signal output by a first electronic device into a signal with a higher frequency band than the baseband signal, using a waveguide as a transmission path, and a detection target mechanism corresponding to a mechanism included in a second electronic device that receives the baseband signal output by the first electronic device, the detection target mechanism being configured to be connected to the first electronic device and to be detected by the first electronic device when the first electronic device and the second electronic device are connected.

According to another embodiment of the present disclosure, there is provided a control method including causing, by a communication device, a first electronic device to detect a detection target mechanism, the communication device including a transmission unit configured to transmit a modulated signal obtained by performing frequency conversion to convert a baseband signal output by the first electronic device into a signal with a higher frequency band than the baseband signal, using a waveguide as a transmission path, and the detection target mechanism corresponding to a mechanism included in a second electronic device that receives the baseband signal output by the first electronic device, the detection target mechanism being configured to be connected to the first electronic device and to be detected by the first electronic device when the first electronic device and the second electronic device are connected.

According to still another embodiment of the present disclosure, there is provided a communication device including a transmission unit configured to transmit a modulated signal obtained by performing frequency conversion to convert a baseband signal output by a first electronic device into a signal with a higher frequency band than the baseband signal, using a waveguide as a transmission path, a detection target mechanism corresponding to a mechanism included in a second electronic device that receives the baseband signal output by the first electronic device, the detection target mechanism being configured to be connected to the first electronic device and to be detected by the first electronic device when the first electronic device and the second electronic device are connected, and a reception unit configured to receive a modulated signal transmitted from another communication device that transmits the modulated signal obtained by performing the frequency conversion on a baseband signal output by the second electronic device and to perform the frequency conversion to convert the modulated signal into the baseband signal.

In the communication device and the control method according to an embodiment of the present technology, when the first electronic device is connected to the second electronic device receiving the baseband signal output by the first electronic device in the communication device, the detection target mechanism detected by the first electronic device and corresponding to the mechanism included in the second electronic device is connected to the first electronic device. As a result, the first electronic device detects the detection target mechanism of the communication device.

The communication device may be an independent device or may be an internal block included in one device.

According to an embodiment of the present technology, it is possible to increase the variations of connection forms between electronic devices.

The advantages described herein are not necessarily limited, but any advantage described in the present disclosure may be realized.

DETAILED DESCRIPTION OF THE EMBODIMENTS

Figure 1:
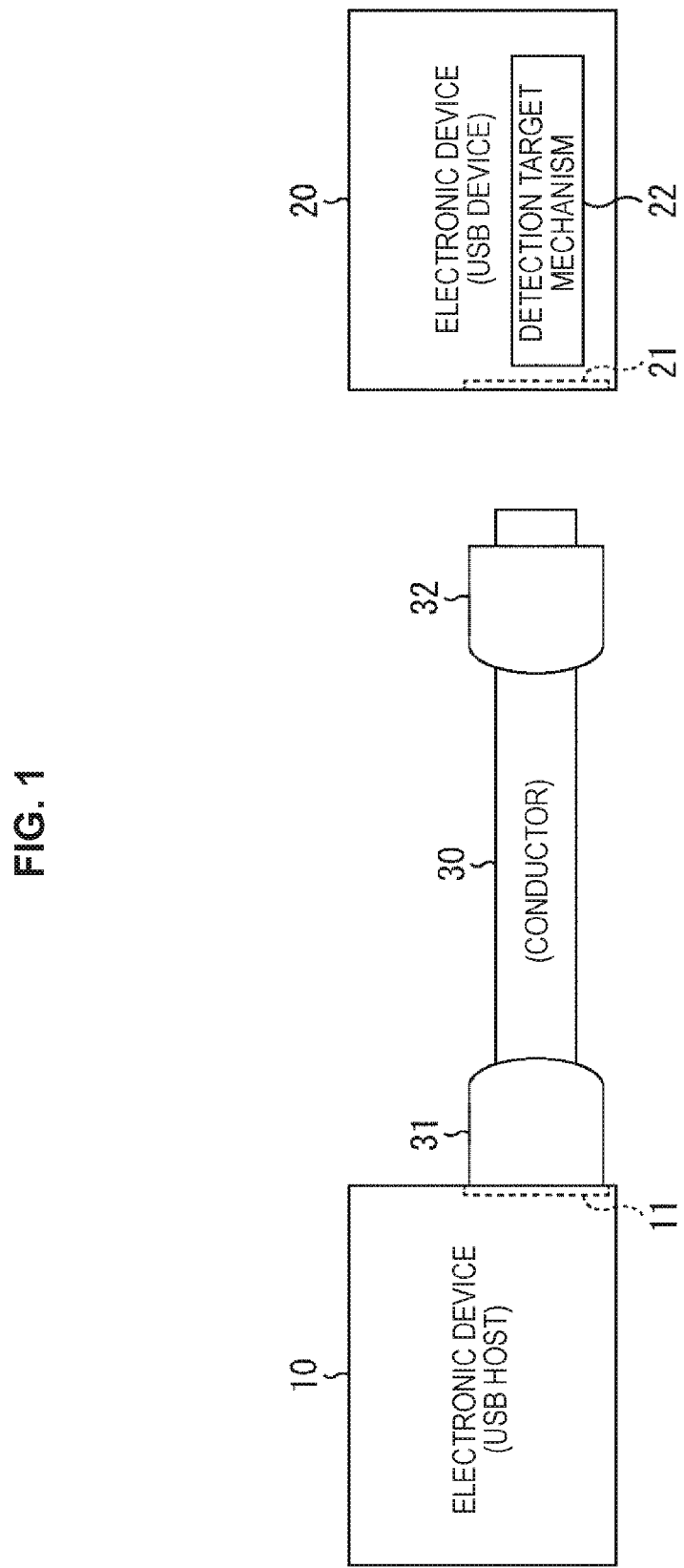
FIG. 1 is a diagram illustrating a configuration example of a communication system in which electronic devices are connected by an electric cable.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<Communication System in which Electronic Devices are Connected by Electric Cable>

FIG. 1 is a diagram illustrating a configuration example of a communication system in which electronic devices are connected by an electric cable.

In the communication system in FIG. 1, electronic devices 10 and 20 are connected by an electric cable 30.

The electronic device 10 includes a connector 11 which can be connected to a connector 31 of the electric cable 30 and is configured to be able to exchange (perform input and output) a baseband signal of a baseband with another device such as the electronic device 20 via the connector 11.

The electronic device 20 includes a connector 21 which can be connected to a connector 32 of the electric cable 30 and is configured to be able to exchange (perform input and output) a baseband signal of a baseband with another device such as the electronic device 10 via the connector 21.

The electronic device 20 includes a detection target mechanism 22 to be detected by the electronic device 10 when the electronic device 10 is connected to the electronic device 20 receiving the baseband signal output by the electronic device 10.

The electric cable 30 is a cable that has, as a core wire (which is a wire connected the connector 31 to the connector 32), a conductor (hereinafter also referred to as a conductor for baseband) used to deliver an electric signal which is a baseband signal. The connector 31 connected to the electronic device 10 is installed at one end of the electric cable 30 and the connector 32 connected to the electronic device 20 is installed at the other end thereof.

In the communication system having the above-described configuration, when the electronic devices 10 and 20 are connected using the electric cable 30, that is, when the connector 11 of the electronic device 10 is connected to the connector 31 of the electric cable 30 and the connector 21 of the electronic device 20 is connected to the connector 32 of the electric cable 30, the electronic device 10 detects the detection target mechanism 22 included in the electronic device 20 via the electric cable 30 and recognizes the connection with the electronic device 20 by detecting the detection target mechanism 22.

In this way, a method of detecting (recognizing) the connection between the electronic devices by detecting the detection target mechanism 22 is adopted in, for example, a USB (USB 3.0) standard.

Hereinafter, an embodiment of the present technology will be described assuming that the electronic devices 10 and 20 are electronic devices conforming to, for example, the USB standard.

When the electronic devices 10 and 20 are electronic devices conforming to the USB standard, the electronic device 10, the electronic device 20, and the electric cable 30 are a USB host, a USB device, and a USB cable, respectively, and are referred to as a USB host 10, a USB device 20, and a USB cable 30 below.

When the electronic devices 10 and 20 are electronic devices conforming to the USB standard, the connector 11 of the electronic device 10 and the connector 21 of the electronic device 20 are USB connectors (sockets) (receptacles). The connectors 11 and 21 are also referred to as USB connectors 11 and 21, respectively, below.

When the electronic devices 10 and 20 are electronic devices conforming to the USB standard, the connectors 31 and 32 of the USB cable 30 are USB connectors (plugs). The connectors 31 and 32 are referred to as USB connectors 31 and 32, respectively, below.

For example, the USB host 10 is an electronic device, such as a personal computer (PC) or a digital camera, that receives power supplied from an external power supply or receives power supplied from a built-in battery by itself (regardless of bus power) to operate and has at least a function of a USB host.

For the USB host 10, the USB connectors 11 and 31 are connected (linked) by inserting the USB connector 31 of the USB cable 20 into the USB connector 11 included in the USB host 10.

For example, the USB device 20 is an electronic device, such as a disc driver, that receives supplied power by bus power or receives power supplied from an external power supply or a built-in battery to operate and has at least a function which a USB device has.

For the USB device 20, the USB connectors 21 and 32 are connected by inserting the USB connector 32 of the USB cable 20 into the USB connector 21 included in the USB device 20.

The USB cable 30 is a cable conforming to the USB standard. The USB connector 31 connected to the USB host 10 is installed at one end of the USB cable 30 and the USB connector 32 connected to the USB device 20 is installed at the other end thereof. The core wire of the USB cable 30 is formed of, for example, a conductor for baseband, for example, copper.

In the communication system having the above-described configuration, when the USB host 10 and the USB device 20 are connected using the USB cable 30, the USB host 10 detects the detection target mechanism 22 included in the USB device 20 via the USB cable 30 and recognizes the connection with the USB device 20 by detecting the detection target mechanism 22.

The detection target mechanism 22 included in the USB device 20 is configured as, for example, a resistor serving as a common mode impedance adopted in the USB 3.0 standard and the USB 3.1 standard.

When the USB host 10 and the USB device 20 are connected, the common mode impedance which is the detection target mechanism 22 included in the USB device 20 is (electrically) connected to the USB host 10. Consequently, the impedance when the side of the USB connector 11 is viewed from the USB host 10 (the inner side of the USB host 10) is changed depending on whether the USB host 10 and the USB device 20 are not connected or the USB host 10 and the USB device 20 are connected.

The USB host 10 recognizes (detects) the connection with the USB device 20 based on the fact that the impedance when the side of the USB connector 11 is viewed from the USB host 10 becomes the impedance when the common mode impedance which is the detection target mechanism 22 is connected to the USB host 10.

In the USB host 10, the detection of the impedance when the side of the USB connector 11 is viewed from the USB host 10, that is, the detection of the common mode impedance which is the detection target mechanism 22, is equivalently performed by detecting a time constant (which is a rate of change in a voltage when the side of the USB connector 11 is viewed from the USB host 10) of the voltage when the side of the USB connector 11 is viewed from the USB host 10.

Figure 2:
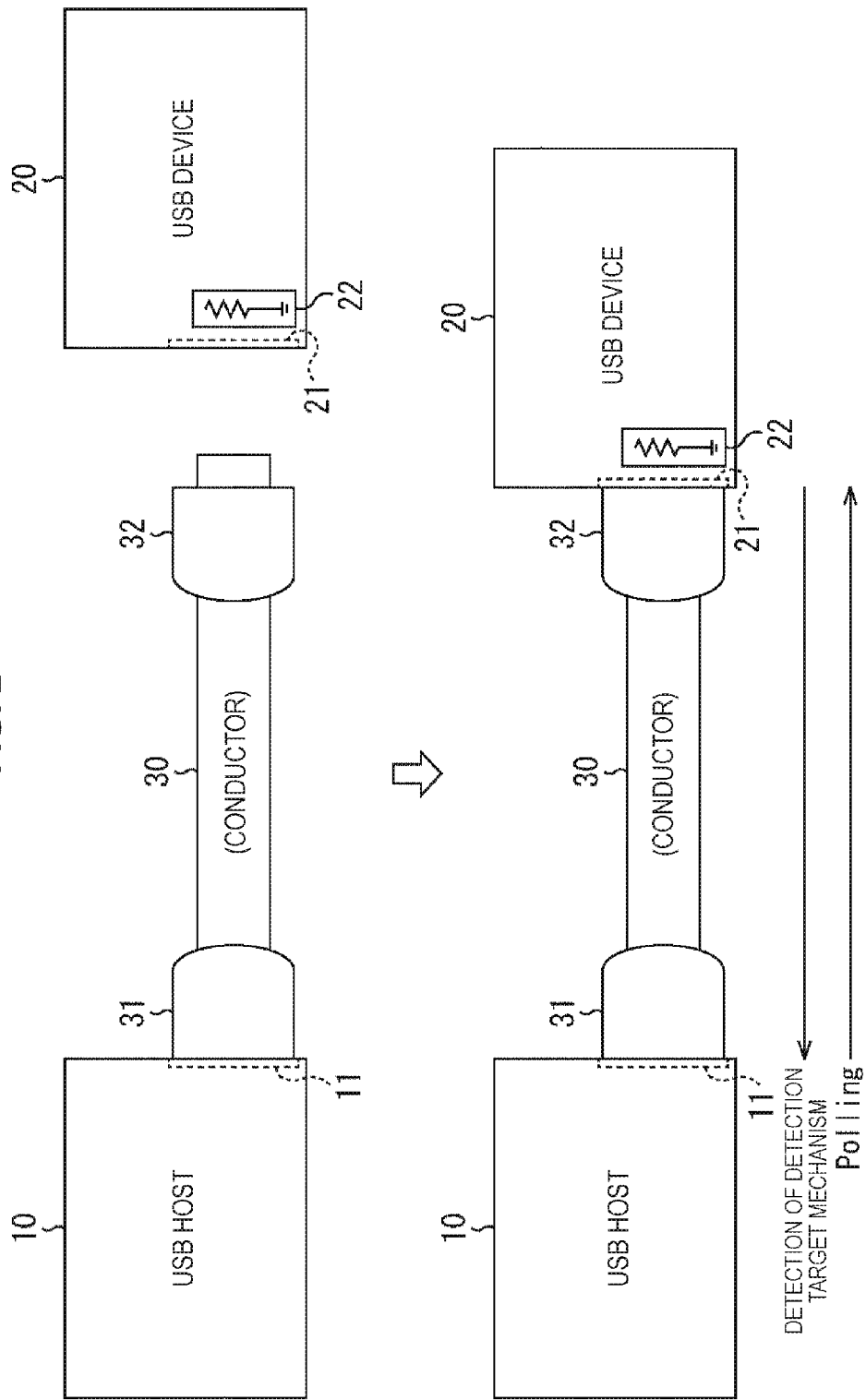
FIG. 2 is a diagram illustrating an operation example of the communication system.

FIG. 2 is a diagram illustrating an operation example of the communication system in FIG. 1.

When the USB host 10 and the USB device 20 are not connected, the detection target mechanism 22 included in the USB device 20 is not connected to the USB host 10, and therefore the detection target mechanism 22 may not be detected from the USB host 10.

When the USB host 10 and the USB device 20 are connected via the USB cable 30, the detection target mechanism 22 included in the USB device 20 is connected to the USB host 10 via the USB cable 30, and thus the detection target mechanism 22 is detected by the USB host 10.

When the USB host 10 detects the detection target mechanism 22, the USB host 10 recognizes (detects) the connection with the USB device 20, transitions to a polling state in which polling starts, and starts outputting a baseband signal as polling from the USB connector 11.

When the USB device 20 responds to the polling from the USB host 10, the USB host 10 and the USB device 20 enter a state in which communication (exchange of the baseband signal) is possible.

<Communication System in which Data Transmission is Performed by a Modulation Signal of a Millimeter Wave Band>

Figure 3:
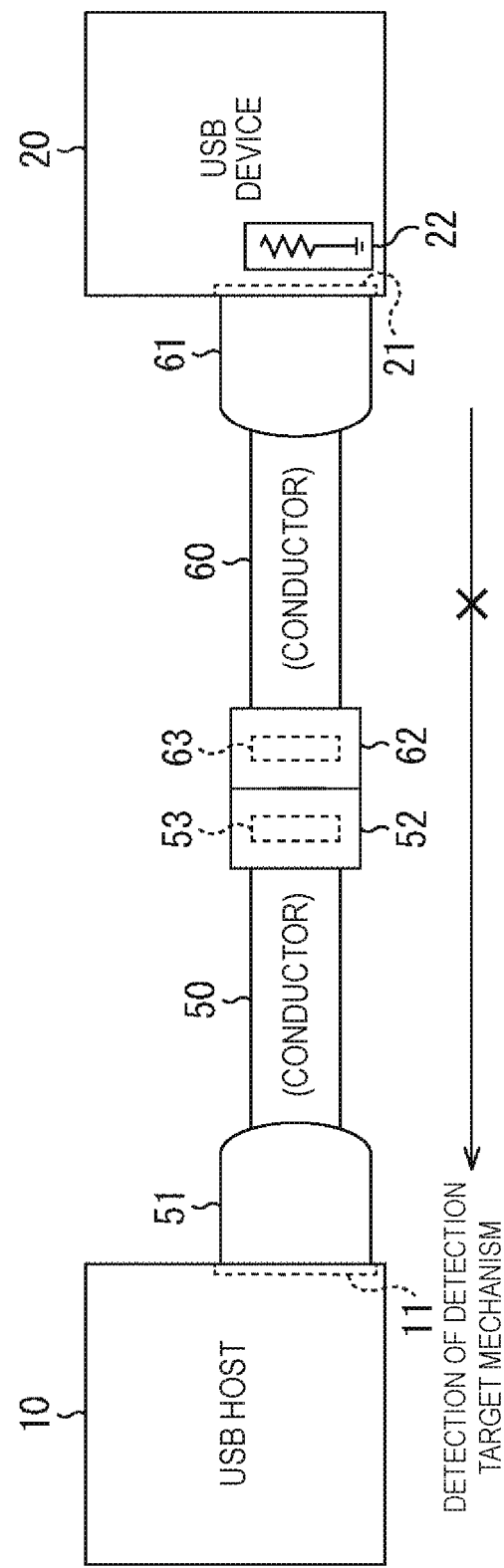
FIG. 3 is a diagram illustrating a configuration example of a communication system in which data transmission is performed by a modulation signal of a millimeter wave band.

FIG. 3 is a diagram illustrating a configuration example of a communication system in which data transmission is performed by a modulation signal of a millimeter wave band.

In the drawing, the same reference numerals are given to portions corresponding to the case of FIG. 1 and the description thereof will be appropriately omitted below.

The communication system in FIG. 3 is similar to the case of FIG. 1 in that the USB host 10 and the USB device 20 are included.

However, the communication system in FIG. 3 is different from the case of FIG. 1 in that millimeter wave cables 50 and 60 are installed instead of the USB cable 30.

Here, a (modulated) signal of a millimeter wave band is a signal that has a frequency of about 30 GHz to about 300 GHz, that is, a wavelength of about 1 mm to about 10 mm. According to the signal of the millimeter wave band, data transmission is possible at a high-speed data rate because of high frequency, and communication in which various waveguides are used as transmission paths can be performed. That is, according to the signal of the millimeter wave band, for example, communication (radio communication) using a free space as a transmission path can be performed, for example, using a small antenna. Further, according to the signal of the millimeter wave band, communication in which a dielectric such as a metallic line or plastic is used as a transmission path can be performed.

The millimeter wave cable 50 is a cable in which a USB connector 51 connected to the USB host 10 is installed at one end and a millimeter wave connector 52 engaging with a millimeter wave connector 62 is installed at the other end. In the millimeter wave cable 50, a conductor for baseband is adopted as a core wire connecting the USB connector 51 to the millimeter wave connector 52 (a communication unit 53 of the millimeter wave connector 52), as in the USB cable 30.

The millimeter wave connector 52 is formed of a material such as a dielectric serving as a waveguide that transmits a modulated signal (radio frequency (RF) signal) of a millimeter wave band and includes the communication unit 53 that performs communication using the modulated signal of the millimeter wave band.

The communication unit 53 performs frequency conversion to convert a differential signal which is a baseband signal supplied from the USB host 10 a via a terminal (for example, a terminal with positive and negative signal transmission lines for USB 3.0 in the case of the USB 3.0 standard) for data transmission (not illustrated) of the USB connector 51 into a modulated signal of a millimeter wave band and transmits the modulated signal (to a communication unit 63) via the millimeter wave connectors 52 and 62 serving as waveguides.

The communication unit 53 receives a modulated signal of a millimeter wave band transmitted (from the communication unit 63) via the millimeter wave connectors 52 and 62 serving as the waveguides, performs the frequency conversion to convert the modulated signal into a baseband signal, and supplies the baseband signal to the USB host 10 via a terminal (for example, a terminal with positive and negative signal reception lines for USB 3.0 in the case of the USB 3.0 standard) for data transmission (not illustrated) of the USB connector 51.

The millimeter wave cable 60 is configured as in the millimeter wave cable 50.

That is, the millimeter wave cable 60 is a cable in which a USB connector 61 connected to the USB device 20 is installed at one end and a millimeter wave connector 62 engaging with the millimeter wave connector 52 is installed at the other end. In the millimeter wave cable 60, a conductor for baseband is adopted as a core wire connecting the USB connector 61 to the millimeter wave connector 62 (the communication unit 63 of the millimeter wave connector 62), as in the USB cable 30.

The millimeter wave connector 62 is formed of a material such as a dielectric serving as the waveguide that transmits a modulated signal of a millimeter wave band and includes the communication unit 63 that performs communication using the modulated signal of the millimeter wave band.

The communication unit 63 performs frequency conversion to convert a differential signal which is a baseband signal supplied from the USB device 20 via a terminal for data transmission (not illustrated) of the USB connector 61 into a modulated signal of a millimeter wave band and transmits the modulated signal (to the communication unit 53) via the millimeter wave connectors 62 and 52 serving as the waveguides.

The communication unit 63 receives a modulated signal of a millimeter wave band transmitted (from the communication unit 53) via the millimeter wave connectors 52 and 62 serving as the waveguides, performs the frequency conversion to convert the modulated signal into a baseband signal, and supplies the baseband signal to the USB device 20 via a terminal for data transmission (not illustrated) of the USB connector 61.

The millimeter wave cables 50 and 60 with a length of, for example, about 10 cm to about 1 m can each be adopted.

In the communication system in FIG. 3 having the above-described configuration, when the USB connector 11 is connected to the USB connector 51, the millimeter wave connector 52 is connected to the millimeter wave connector 62, and the USB connector 21 is connected to the USB connector 61, data can be transmitted between the USB host 10 and the USB device 20 via the millimeter wave cables 50 and 60.

That is, a baseband signal which is data transmitted by the USB host 10 is subjected to frequency conversion to be converted into a modulated signal of a millimeter wave band and is transmitted by the communication unit 53.

The modulated signal transmitted by the communication unit 53 is received by the communication unit 63, is subjected to the frequency conversion to be converted into a baseband signal, and is supplied to the USB device 20.

On the other hand, a baseband signal which is data transmitted by the USB device 20 is subjected to frequency conversion to be converted into a modulated signal of a millimeter wave band and is transmitted by the communication unit 63.

The modulated signal transmitted by the communication unit 63 is received by the communication unit 53, is subjected to the frequency conversion to be converted into a baseband signal, and is supplied to the USB host 10.

In the communication system in FIG. 3, as described above, the USB host 10 and the USB device 20 which are electronic devices are connected to the millimeter wave cables 50 and 60 rather than the USB cable 30, and data is transmitted through the modulated signal of the millimeter wave band between the USB host 10 and the USB device 20. Therefore, it is possible to increase variations of connection forms between the electronic devices.

Here, in the communication system in FIG. 3, the millimeter wave connectors 52 and 62 including the communication units 53 and 63 transmitting and receiving the modulated signal of the millimeter wave band can be formed of a dielectric such as a plastic or another nonmetal.

Accordingly, waterproof or dustproof countermeasures can be performed more easily in the millimeter wave connectors 52 and 62 than in connectors formed of a metal.

Thus, the degree of design freedom can be improved without consideration of deterioration in a contact point caused due to insertion and extraction.

The millimeter wave connectors 52 and 62 can also be formed of a metal rather than a nonmetal.

In FIG. 3, the communication unit 53 is included in the millimeter wave connector 52. However, the communication unit 53 can also be included in, for example, the USB connector 51.

When the communication unit 53 is included in the USB connector 51, it is necessary to configure a waveguide (for example, to form a transmission path guiding a millimeter wave through dielectrics with different dielectric constants) serving as a transmission path of a millimeter wave rather than a conductor for baseband between the millimeter wave connector 52 and the USB connector 51 of the millimeter wave cable 50.

Likewise, the communication unit 63 can be included in the USB connector 61 rather than the millimeter wave connector 62. When the communication unit 63 is included in the USB connector 61, it is also necessary to configure a waveguide serving as a transmission path of a millimeter wave between the millimeter wave connector 62 and the USB connector 61 of the millimeter wave cable 60.

<Configuration Examples of Communication Units 53 and 63>

Figure 4:
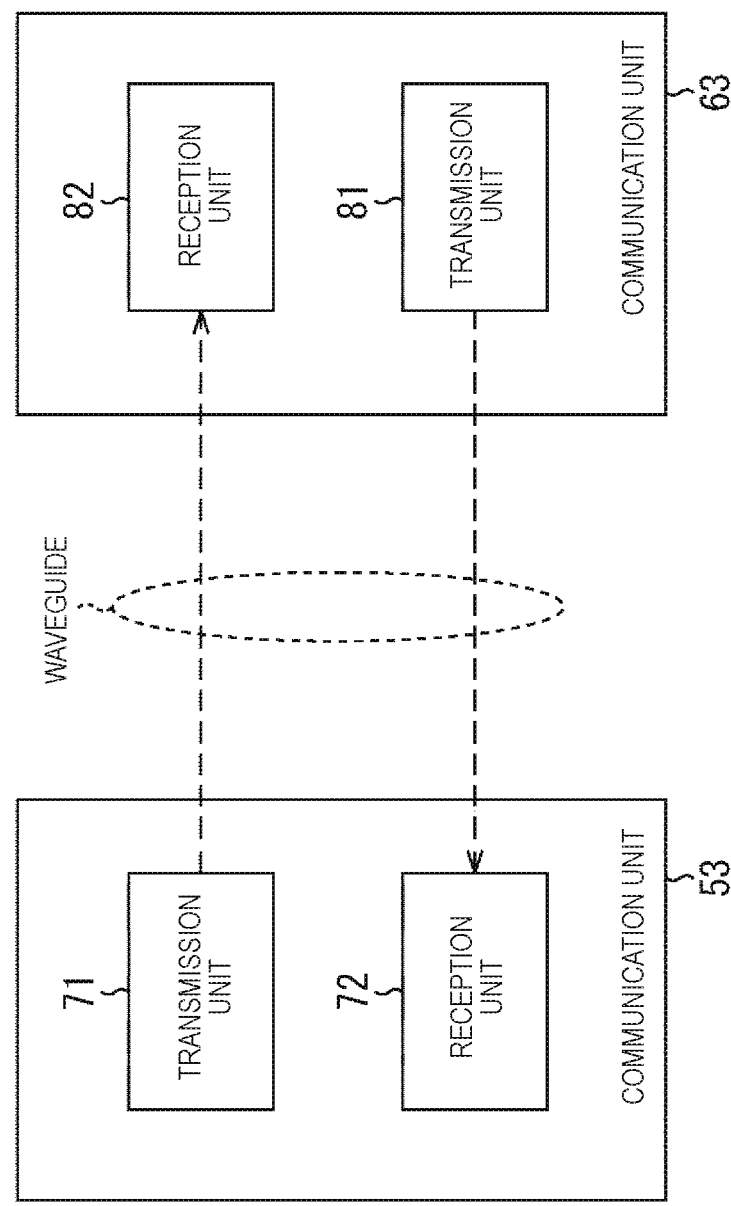
FIG. 4 is a block diagram illustrating configuration examples of communication units 53 and 63.

FIG. 4 is a block diagram illustrating configuration examples of communication units 53 and 63 in FIG. 3.

The communication unit 53 includes a transmission unit 71 and a reception unit 72.

For example, the transmission unit 71 transmits signals (data) in conformity with a carrier-wave communication scheme using signals of a millimeter wave band as carriers. That is, the transmission unit 71 performs the frequency conversion to convert the baseband signals (supplied from the USB host 10) into the modulated signals of the millimeter wave band and transmits the modulated signals (to a reception unit 82) via the millimeter wave connectors 52 and 62 (FIG. 3) serving as the waveguides.

The reception unit 72 receives the modulated signals of the millimeter wave band transmitted in conformity with the carrier-wave communication scheme (from a transmission unit 81) via the millimeter wave connectors 62 and 52 serving as the waveguides, performs the frequency conversion to convert the modulated signals into the baseband signals, and outputs the modulated signals (to the USB host 10).

The communication unit 63 includes the transmission unit 81 and the reception unit 82.

For example, the transmission unit 81 transmits signals in a carrier-wave communication scheme in which millimeter wave signals of the same frequency band as that of the transmission unit 71 or a frequency band different from that of the transmission unit 71 are used as carriers. That is, the transmission unit 81 performs the frequency conversion to convert the baseband signals (supplied from the USB device 20) into the modulated signals of the millimeter wave band and transmits the modulated signals (to the reception unit 72) via the millimeter wave connectors 62 and 52 serving as the waveguides.

The reception unit 82 receives the modulated signals of the millimeter wave band transmitted in conformity with the carrier-wave communication scheme (from the transmission unit 71) via the millimeter wave connectors 52 and 62 serving as the waveguides, converts the frequency conversion to convert the modulated signals into the baseband signals, and outputs the baseband signals (to the USB device 20).

As described above, since the communication unit 53 includes the transmission unit 71 and the reception unit 72 and the communication unit 63 includes the transmission unit 81 and the reception unit 82, duplex communication can be performed between the communication units 53 and 63.

When the millimeter wave signals with the same frequency band are used as carriers in the transmission units 71 and 81, half duplex communication can be performed between the communication units 53 and 63. However, even when the millimeter wave signals with the same frequency band are used as the carriers in the transmission units 71 and 81, full duplex communication can be performed by isolating the transmission units 71 and 81. When the millimeter wave signals with different frequency bands are used as the carriers in the transmission units 71 and 81, full duplex communication can be performed between the communication units 53 and 63.

<Configuration Examples of Transmission Unit 71 and Reception Unit 72, and Transmission Unit 81 and Reception Unit 82>

Figure 5:
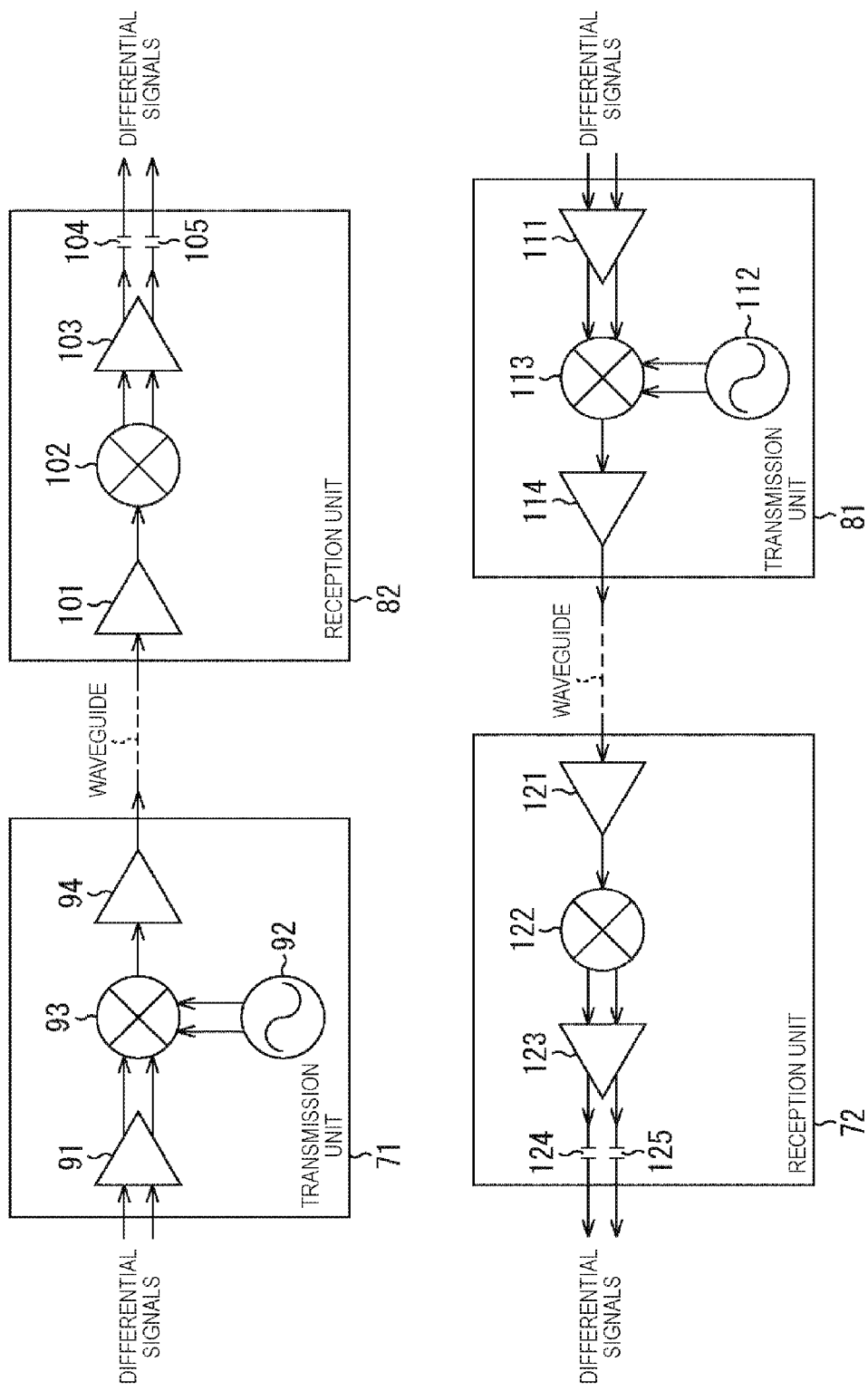
FIG. 5 is a diagram illustrating configuration examples of a transmission unit 71 and a reception unit 72, and a transmission unit 81 and a reception unit 82.

FIG. 5 is a diagram illustrating configuration examples of a transmission unit 71 and a reception unit 72, and a transmission unit 81 and a reception unit 82 in FIG. 4.

The transmission unit 71 includes an amplifier 91, an oscillator 92, a mixer 93, and an amplifier 94.

The USB host 10 supplies the amplifier 91 with the differential signals (for example, signals of positive and negative signal transmission lines for USB 3.0 in the case of USB 3.0) which are baseband signals.

The amplifier 91 amplifies the differential signals, as necessary, and supplies the differential signals to the mixer 93.

The oscillator 92 generates, for example, the carriers of the millimeter wave band of 56 GHz or the like through oscillation and supplies the carriers of the millimeter wave band to the mixer 93.

Here, according to the carriers of the millimeter wave band of 56 GHz or the like, the differential signals of, for example, the maximum data rate of 11 Gbps (gigabits per second) can be transmitted. For example, since the maximum data rate is 5 Gbps in USB 3.0, the data (the differential signals) of USB 3.0 can be transmitted without problem through the carriers of the millimeter wave band of 56 GHz or the like.

The mixer 93 performs the frequency conversion on the differential signals by the carriers from the oscillator 92 by mixing (multiplying) the differential signals from the amplifier 91 and the carriers from the oscillator 92 and supplies the amplifier 94 with the modulated signals of the millimeter wave band, for example, amplitude modulation (Amplitude Shift Keying (ASK)), obtained as the result.

The amplifier 94 amplifies the modulated signals from the mixer 93, as necessary, and outputs (transmits) the modulated signals to the waveguide (the millimeter wave connector 52 serving as the waveguide).

The reception unit 82 includes an amplifier 101, a mixer 102, an amplifier 103, and capacitors 104 and 105.

The amplifier 101 receives the modulated signals of the millimeter wave band transmitted from the transmission unit 71 through the waveguides (the millimeter wave connectors 52 and 62 serving as the waveguides), amplifies the modulated signals, as necessary, and supplies the modulated signals to the mixer 102.

The mixer 102 performs the frequency conversion to convert the modulated signals of the millimeter wave band from the amplifier 101 into the differential signals which are baseband signals by squared detection of mixing the modulated signals (squaring the modulated signals) of the millimeter wave band supplied from the amplifier 101 and supplies the differential signals to the amplifier 103.

The amplifier 103 amplifies the differential signals from the mixer 102, as necessary, and supplies the differential signals of a USB (for example, signals of positive and negative signal transmission lines for USB 3.0 in the case of USB 3.0) to the USB device 20.

Of the two (baseband) signals which are the differential signals obtained by the amplifier 103, one signal (hereinafter also referred to as a positive signal) is supplied to the USB device 20 via the capacitor 104 and the other signal (hereinafter referred to as a negative signal) is supplied to the USB device 20 via the capacitor 105. Direct currents are cut in the capacitors 104 and 105.

In FIG. 5, the reception unit 82 performs the frequency conversion to convert the modulated signals of the millimeter wave band to the baseband signals through the squared detection. However, for example, the reception unit 82 can also generate carriers and perform the frequency conversion to convert the modulated signals into the baseband signals through detection other than the squared detection, such as synchronized detection of mixing the carriers with the modulated signals.

The transmission unit 81 includes an amplifier 111, an oscillator 112, a mixer 113, and an amplifier 114.

The amplifiers 111 to 114 have the same configuration as the amplifiers 91 to 94 of the transmission unit 71, and thus the description thereof will be omitted.

The reception unit 72 includes an amplifier 121, a mixer 122, an amplifier 123, and capacitors 124 and 125.

The amplifier 121 to the capacitor 125 have the same configurations as the amplifier 101 to the capacitor 105 of the reception unit 82, and thus the description thereof will be omitted.

In the transmission unit 71 and the reception unit 72, and the transmission unit 81 and the reception unit 82 having the above-described configurations, the transmission of the baseband signals from the USB host 10 to the USB device 20 is performed by transmitting the modulated signals of the millimeter wave band from the transmission unit 71 and receiving the modulated signals by the reception unit 82.

The transmission of the baseband signals from the USB device 20 to the USB host 10 is performed by transmitting the modulated signals of the millimeter wave band from the transmission unit 81 and by receiving the modulated signals at the reception unit 72.

However, in the communication system in FIG. 3, the USB host 10 and the USB device 20 are connected via the communication units 53 and 63 exchanging the modulated signals of the millimeter wave band. Therefore, even when the USB host 10 and the USB device 20 are connected using the millimeter wave cables 50 and 60, it is difficult for the USB host 10 to detect the detection target mechanism 22 included in the USB device 20.

When the detection target mechanism 22 included in the USB device 20 is not detected, the USB host 10 does not recognize (detect) the connection with the USB device 20 and does not perform polling.

As a result, even when the USB host 10 and the USB device 20 are connected using the millimeter wave cables 50 and 60, a problem that the data transmission (the exchange of the baseband signal) is not performed between the USB host 10 and the USB device 20 may occur.

Accordingly, in an embodiment of the present disclosure, the problem that the data transmission is not performed is prevented from occurring by increasing variations of connection forms between the electronic devices, that is, the USB host 10 and the USB device 20.

<Communication System of First Embodiment to which the Present Technology is Applied>

Figure 6:
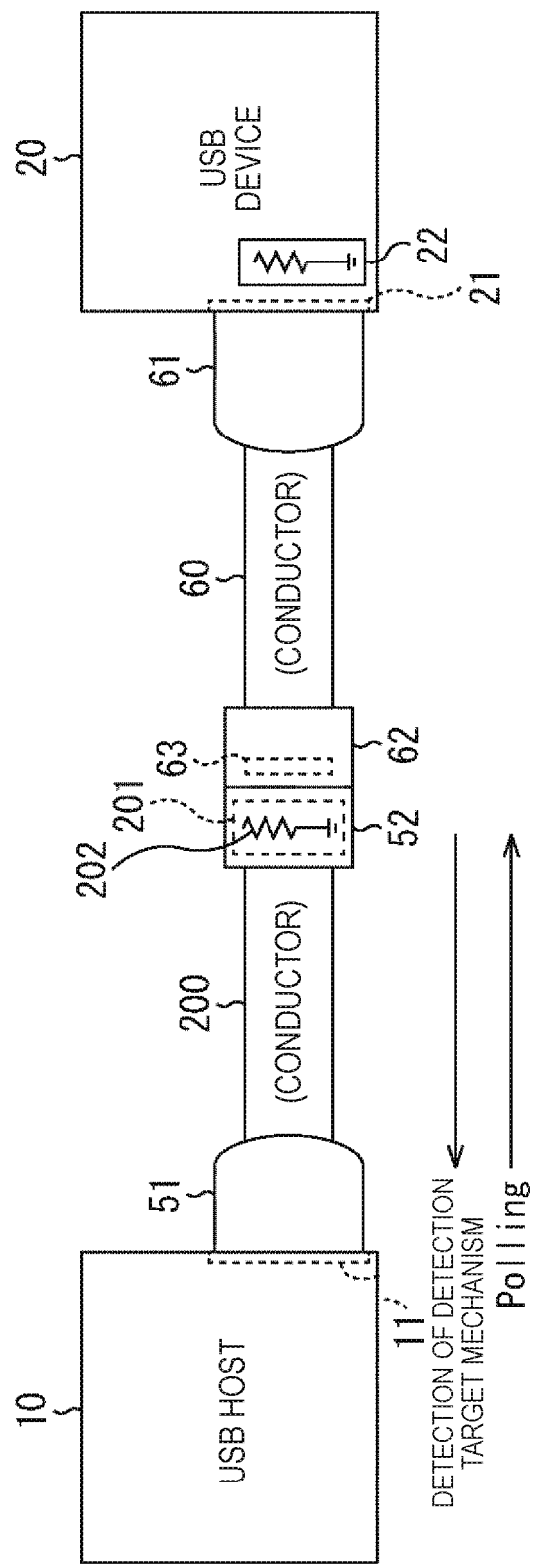
FIG. 6 is a diagram illustrating a configuration example of a communication system of a first embodiment to which the present technology is applied.

FIG. 6 is a diagram illustrating a configuration example of a communication system of a first embodiment to which the present technology is applied.

In the drawing, the same reference numerals are given to portions corresponding to the case of FIG. 3 and the description thereof will be appropriately omitted below.

The communication system in FIG. 6 is similar to the case of FIG. 3 in that the USB host 10, the USB device 20, and the millimeter wave cable 60 are included.

However, the communication system in FIG. 6 is different from the case of FIG. 3 in that a millimeter wave cable 200 is installed instead of the millimeter wave cable 50.

The millimeter wave cable 200 is similar to the millimeter wave cable 50 in FIG. 3 in that the USB connector 51 and the millimeter wave connector 52 are included.

However, the millimeter wave cable 200 is different from the millimeter wave cable 50 in FIG. 3 in that the millimeter wave connector 52 includes a communication unit 201 instead of the communication unit 53.

As in the case of FIG. 3, the communication unit 201 can be included in the USB connector 51 rather than the millimeter wave connector 52.

As in the communication unit 53 in FIG. 3, the communication unit 201 performs the frequency conversion to convert the differential signals which are the baseband signals from the USB host 10 into the modulated signals of the millimeter wave band, transmits the modulated signals, receives the modulated signals of the millimeter wave band, performs the frequency conversion to convert the modulated signals into the baseband signals, and supplies the baseband signals to the USB host 10.

The communication unit 201 includes a detection target mechanism 202. The detection target mechanism 202 corresponds to the detection target mechanism 22 included in the USB device 20 (is the same mechanism as the detection target mechanism 22). When the USB connector 51 is connected to the USB connector 11 of the USB host 10, the USB connector 51 is connected (electrically) to the USB host 10.

Accordingly, as in the case in which the USB host 10 detects the detection target mechanism 22 included in the USB device 20 and recognizes the connection with the USB device 20 when the USB host 10 is connected to the USB device 20 via the USB cable 30 in FIG. 1, the USB host 10 detects the detection target mechanism 202 included in the communication unit 201 and recognizes the connection with the USB device 20 (despite the fact that the USB device 20 is not actually connected) when the millimeter wave cable 200 is connected.

As a result, in the USB host 10, the polling starts and the data transmission (the exchange of the baseband signals) is performed with the USB device 20 (when the USB device 20 is actually connected).

In the communication system in FIG. 6, as described above, it is possible to resolve the problem that the data transmission may not be performed between the USB host 10 and the USB device 20.

<Configuration Example of Communication Unit 201>

Figure 7:
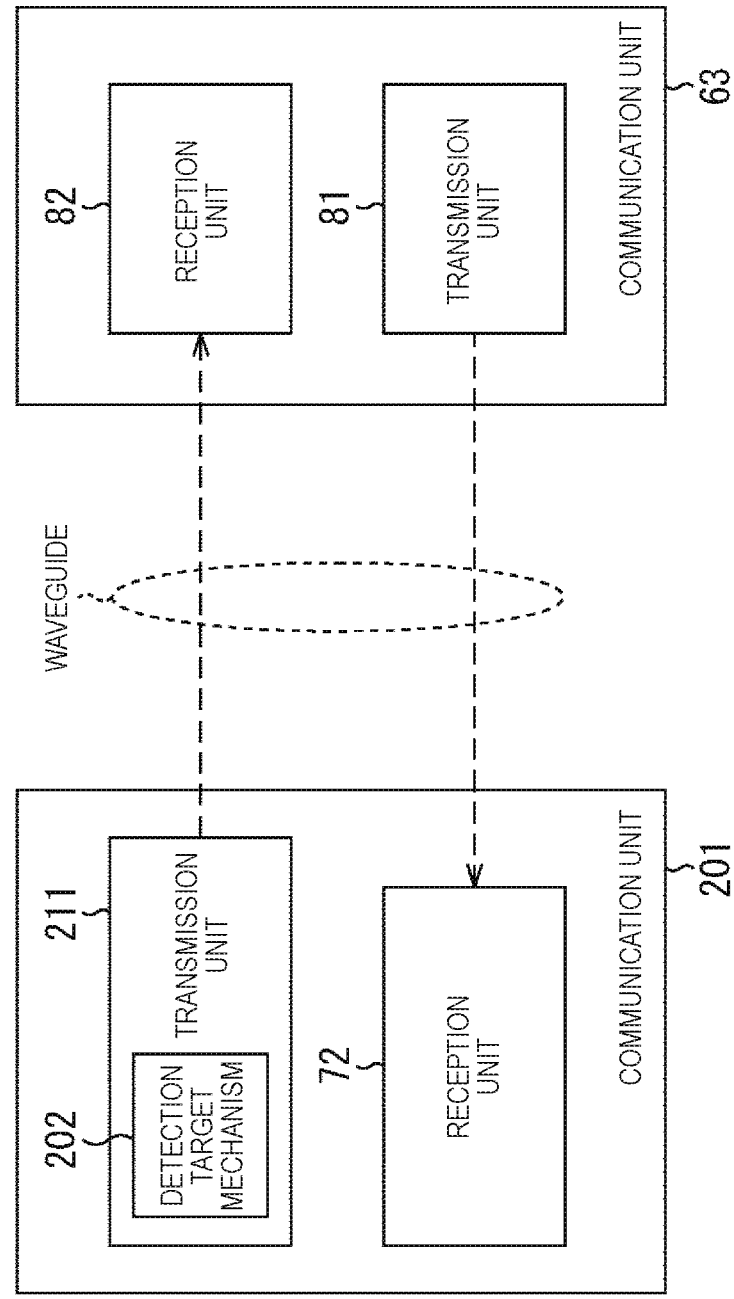
FIG. 7 is a block diagram illustrating a configuration example of a communication unit 201.

FIG. 7 is a block diagram illustrating a configuration example of the communication unit 201 in FIG. 6.

In the drawing, the same reference numerals are given to portions corresponding to the communication unit 53 in FIG. 4 and the description thereof will be appropriately omitted below.

The communication unit 201 is similar to the communication unit 53 in FIG. 4 in that the reception unit 72 is included.

However, the communication unit 201 is different from the communication unit 53 in FIG. 4 in that the transmission unit 211 is included instead of the transmission unit 71.

As in the transmission unit 71 in FIG. 4, the transmission unit 211 performs the frequency conversion to convert the baseband signal (supplied from the USB host 10) into the modulated signal of the millimeter wave band and transmits the modulated signal (to the reception unit 82) via the millimeter wave connectors 52 and 62 serving as the waveguides.

The transmission unit 211 further includes the detection target mechanism 202. The detection target mechanism 202 is installed on a path through which the baseband signal is supplied from the USB host 10 to the transmission unit 211.

Accordingly, when the millimeter wave cable 200 (FIG. 6) (the USB connector 51) is connected to the USB host 10 (the USB connector 11 of the USB host 10), the USB host 10 detects the detection target mechanism 202 via a path through which the baseband signal is supplied to the transmission unit 211 and recognizes the connection with the USB device 20 (despite the fact that the USB device 20 is not actually connected).

In the communication system in FIG. 6, when a device detecting the detection target mechanism and recognizing connection with a communication partner is used instead of the USB device 20 as in the USB host 10, a communication unit having the same configuration as the communication unit 201 is installed instead of the communication unit 63 in FIG. 7.

<Example of Operation of Communication System>

Figure 8:
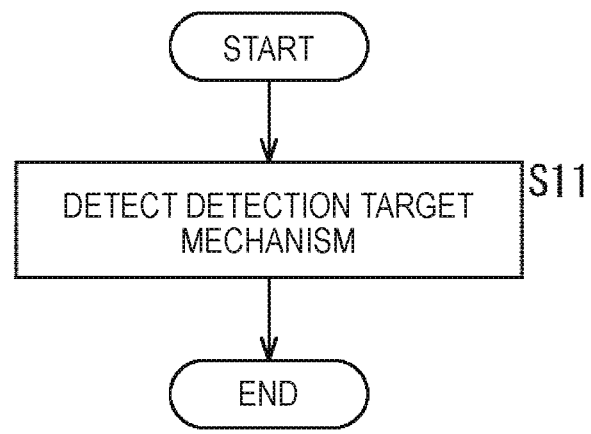
FIG. 8 is a flowchart for describing an example of an operation of the communication system.

FIG. 8 is a flowchart for describing an example of an operation of the communication system in FIG. 6.

When the millimeter wave cable 200 (FIG. 6) is connected to the USB host 10, the USB host 10 is connected to the transmission unit 211 via the path through which the baseband signal is supplied to the transmission unit 211. Thus, in step S11, the transmission unit 211 causes the USB host 10 to detect the detection target mechanism 202 installed on the path through which the baseband signal is supplied from the USB host 10 to the transmission unit 211.

When the USB host 10 detects the detection target mechanism 202, the USB host 10 recognizes the connection with the USB device 20 and starts the polling.

Then, when the USB device 20 responds to the polling, the USB host 10 starts the data transmission (the exchange of the baseband signal) with the USB device 20.

<Configuration Example of Transmission Unit 211>

Figure 9:
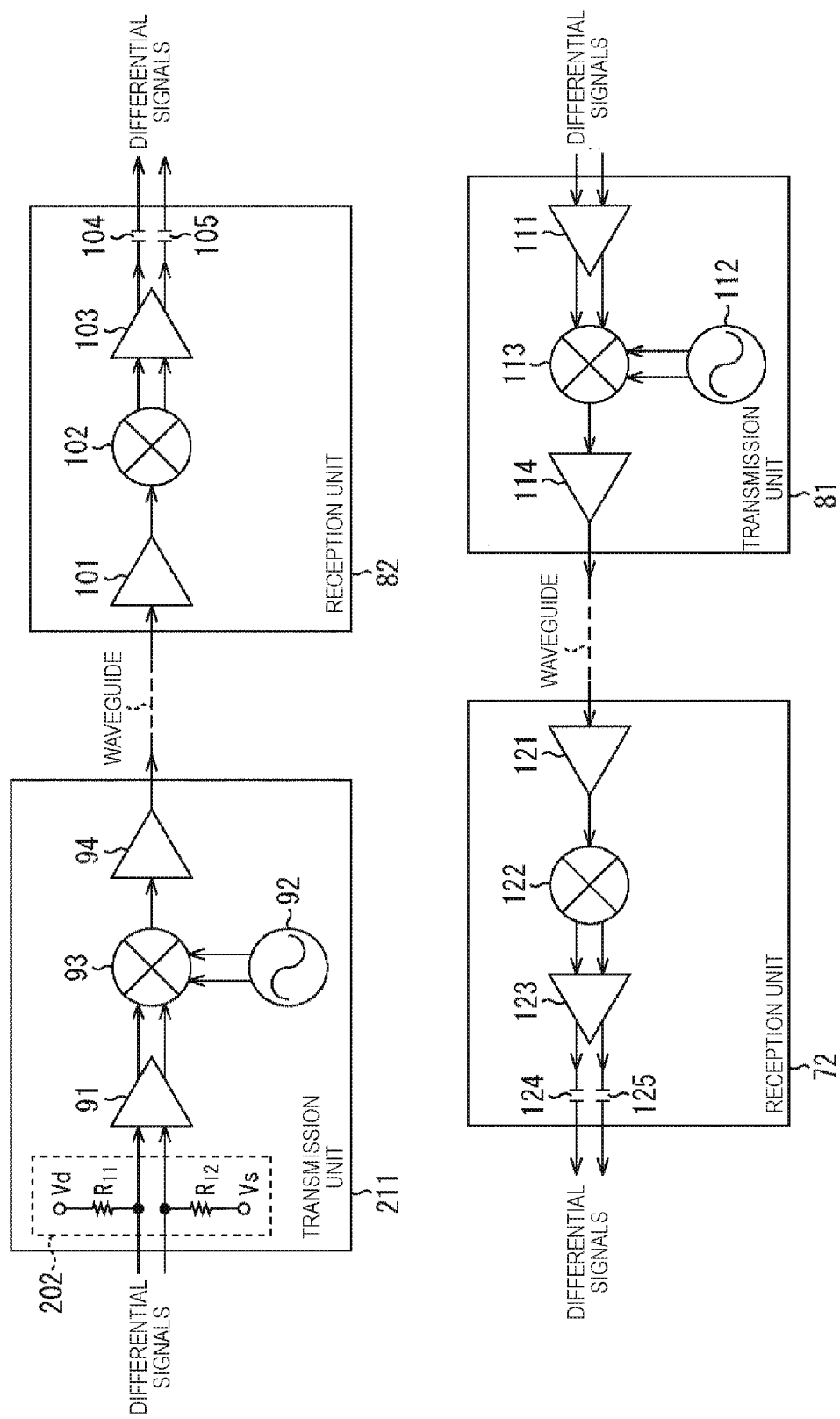
FIG. 9 is a diagram illustrating a configuration example of a transmission unit 211.

FIG. 9 is a diagram illustrating a configuration example of the transmission unit 211.

In the drawing, the same reference numerals are given to portions corresponding to the transmission unit 71 in FIG. 5 and the description thereof will be appropriately omitted below.

The transmission unit 211 is similar to the transmission unit 71 in FIG. 5 in that the amplifier 91, the oscillator 92, the mixer 93, and the amplifier 94 are included.

However, the transmission unit 211 is different from the transmission unit 71 in FIG. 5 in that a detection target mechanism 202 is included.

The detection target mechanism 202 is configured to include resistors $R_{11}$ and $R_{12}$ serving as the common mode impedance adopted in the USB 3.0 standard or the USB 3.1 standard.

One end of each of the resistors $R_{11}$ and $R_{12}$ is connected to an input terminal of the amplifier 91 to which the differential signal which is the baseband signal is supplied from the USB host 10. The other ends of the resistors $R_{11}$ and $R_{12}$ are connected to power supplies $V_d$ and $V_s$, respectively.

That is, the one end of the resistor $R_{11}$ is connected to the input terminal to which a positive signal which is one signal of the differential signals is supplied (input) between two input terminals of the amplifier 91, and the other end thereof is connected to the power supply $V_d$.

The one end of the resistor $R_{12}$ is connected to the input terminal to which a negative signal which is the other signal of the differential signals is supplied (input) between the two input terminals of the amplifier 91, and the other end thereof is connected to the power supply $V_s$.

Here, the negative and positive signals which are the differential signals are ideally negative and positive signals having a sum of 0.

The power supply $V_d$ is, for example, a power supply of a voltage +v (>0) and the power supply $V_s$ is, for example, a power supply of a voltage −v.

In the transmission unit 211 having the above-described configuration, when the millimeter wave cable 200 (FIG. 6) is connected to the USB host 10, the USB host 10 detects the resistors $R_{11}$ and $R_{12}$ serving as the common mode impedance configuring the detection target mechanism 202 connected to the input terminal of the amplifier 91.

Thus, the USB host 10 recognizes the connection with the USB device 20 and starts the polling.

Then, when the USB device 20 responds to the polling, the USB host 10 starts the data transmission (the exchange of the baseband signal) with the USB device 20.

The exchange of the baseband signal between the USB host 10 and the USB device 20 is performed as follows.

That is, the baseband signals which are the differential signals output by the USB host 10 pass through the amplifier 91, the mixer 93, and the amplifier 94 of the transmission unit 211 to be converted into the modulated signals of the millimeter wave band, and then the modulated signals are transmitted to the reception unit 82 via the millimeter wave connectors 52 and 62 serving as the waveguides.

The modulated signals from the transmission unit 211 are received by the reception unit 82 and pass through the amplifier 101, the mixer 102, the amplifier 103, and the capacitors 104 and 105 to be converted into the baseband signals which are the differential signals, and then the baseband signals are supplied to the USB device 20.

On the other hand, the baseband signals which are the differential signals output by the USB device 20 pass through the amplifier 111, the mixer 113, and the amplifier 114 of the transmission unit 81 to be converted into the modulated signals of the millimeter wave band, and then the modulated signals are transmitted to the reception unit 72 via the millimeter wave connectors 62 and 52 serving as the waveguides.

The modulated signals from the transmission unit 81 are received by the reception unit 72 and pass through the amplifier 121, the mixer 122, the amplifier 123, and the capacitors 124 and 125 to be converted into the baseband signals which are the differential signals, and then the baseband signals are supplied to the USB host 10.

<Example of Operation of USB Host 10>

Figure 10:
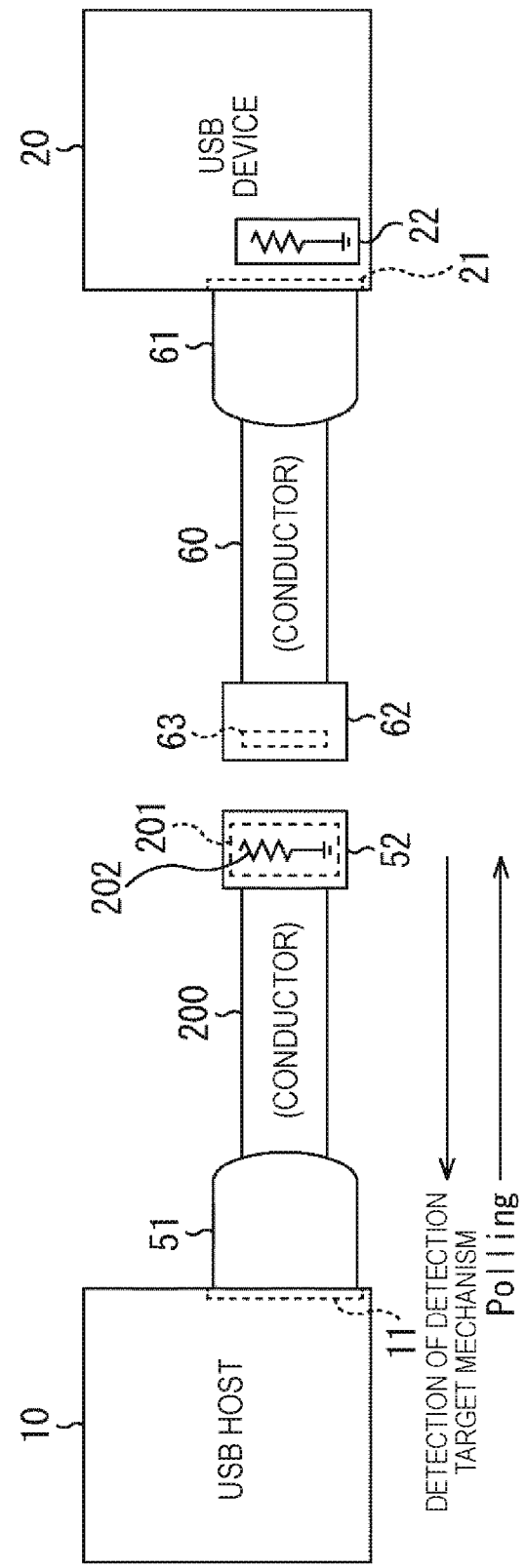
FIG. 10 is a diagram illustrating an example of an operation of a USB host 10 in the communication system.

FIG. 10 is a diagram illustrating an example of an operation of the USB host 10 in the communication system in FIG. 6.

As described with reference to FIGS. 6 to 9, when the millimeter wave cable 200 is connected to the USB host 10, the USB host 10 detects the detection target mechanism 202 installed in the millimeter wave connector 52 of the millimeter wave cable 200, recognizes the connection with the USB device 20, and starts the polling.

Here, when the USB host 10 and the USB device 20 are connected via the millimeter wave cables 200 and 60, as illustrated in FIG. 6, the USB device 20 responds to the polling from the USB host 10. Thereafter, the data transmission is performed between the USB host 10 and the USB device 20.

Incidentally, for example, as illustrated in FIG. 10, when the millimeter wave cable 200 is connected to the USB host 10 despite the fact that the millimeter wave connector 52 of the millimeter wave cable 200 is not connected to the millimeter wave connector 62 of the millimeter wave cable 60, the USB host 10 detects the detection target mechanism 202 included in the communication unit 201 installed in the millimeter wave connector 52 of the millimeter wave cable 200, consequently recognizes the connection with the USB device 20, and starts the polling.

However, when the millimeter wave connector 52 of the millimeter wave cable 200 is not connected to the millimeter wave connector 62 of the millimeter wave cable 60 (when the millimeter wave connectors 52 and 62 are separated more than a distance in which the modulated signals of the millimeter wave band can be received at a minimum necessary level), the USB host 10 is disconnected from the USB device 20. Therefore, the USB device 20 does not respond to the polling of the USB host 10.

Accordingly, the USB host 10 and the USB device 20 are not connected (the USB host 10 is disconnected from the USB device 20), but the polling (data transmission for the polling) is continuously performed, and thus power is unnecessarily consumed.

Accordingly, in an embodiment of the present technology, by controlling the connection between the detection target mechanism (for example, a common mode impedance serving as the detection target mechanism) and the USB host 10 according to the connection state between the USB host 10 and the USB device 20, the above-described unnecessary power consumption in the USB host 10 is prevented.

<Communication System of Second Embodiment to which the Present Technology is Applied>

Figure 11:
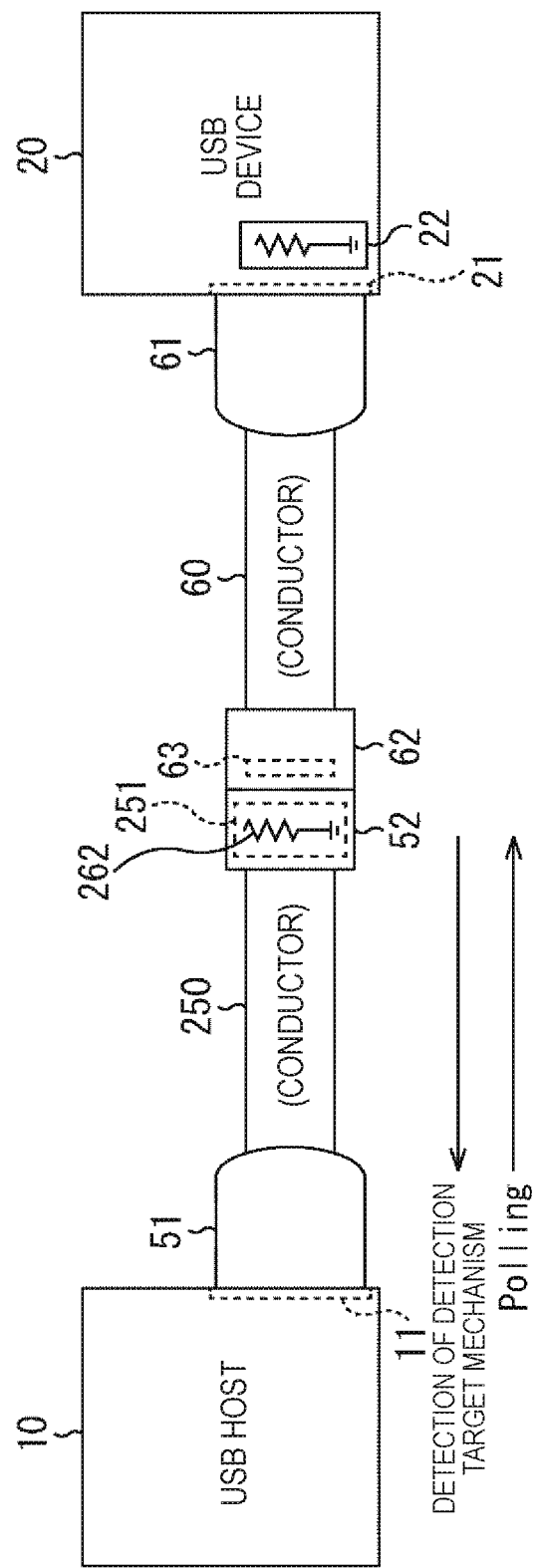
FIG. 11 is a diagram illustrating a configuration example of a communication system of a second embodiment to which the present technology is applied.

FIG. 11 is a diagram illustrating a configuration example of a communication system of a second embodiment to which the present technology is applied.

In the drawing, the same reference numerals are given to portions corresponding to the case of FIG. 6 and the description thereof will be appropriately omitted below.

The communication system in FIG. 11 is similar to the case of FIG. 6 in that the USB host 10, the USB device 20, and the millimeter wave cable 60 are included.

However, the communication system in FIG. 11 is different from the case of FIG. 6 in that a millimeter wave cable 250 is installed instead of the millimeter wave cable 200.

The millimeter wave cable 250 is similar to the millimeter wave cable 200 in FIG. 6 in that the USB connector 51 and the millimeter wave connector 52 are included.

However, the millimeter wave cable 250 is different from the millimeter wave cable 200 in FIG. 6 in that the millimeter wave connector 52 includes a communication unit 251 instead of the communication unit 201.

As in the cases of FIGS. 3 and 6, the communication unit 251 can be included in the USB connector 51 rather than the millimeter wave connector 52.

The communication unit 251 is similar to the communication unit 201 in FIG. 6 in that the communication unit 251 performs the frequency conversion to convert the differential signals which are the baseband signals from the USB host 10 into the modulated signals of the millimeter wave band and transmits the modulated signals, and receives the modulated signals of the millimeter wave band, performs the frequency conversion to convert the modulated signals into the baseband signals, and supplies the baseband signals to the USB host 10.

However, the communication unit 251 is different from the communication unit 201 in FIG. 6 in that a detection target mechanism 262 is included instead of the detection target mechanism 202 (FIGS. 6 and 7).

The detection target mechanism 262 is similar to the detection target mechanism 202 in that the detection target mechanism 262 is connected (electrically) to the USB host 10 and is accordingly detected by the USB host 10 when the USB connector 51 is connected to the USB connector 11 of the USB host 10.

However, the detection target mechanism 262 is different from the detection target mechanism 202 in that the connection with the USB host 10 is configured to be controlled.

<Configuration Example of Communication Unit 251>

Figure 12:
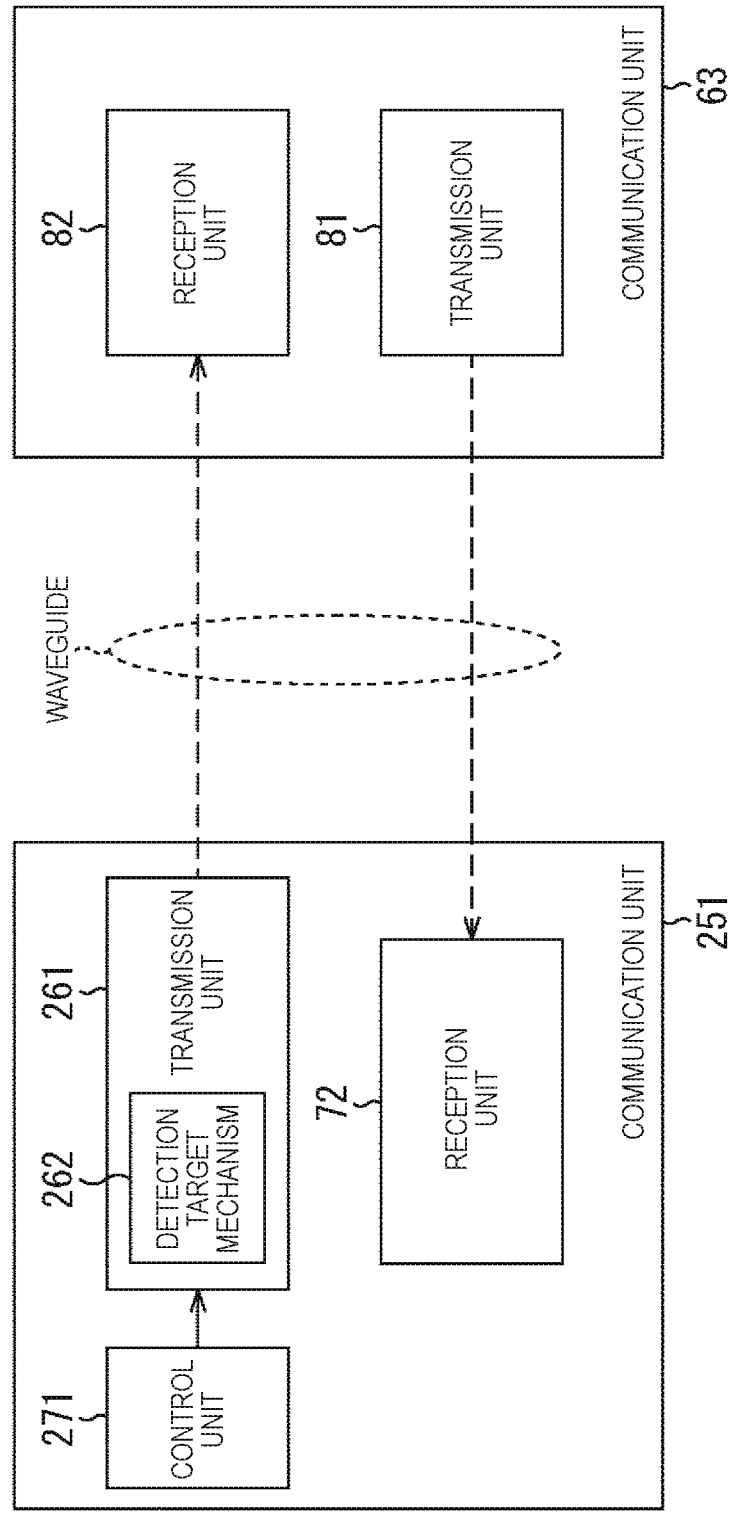
FIG. 12 is a block diagram illustrating a configuration example of a communication unit 251.

FIG. 12 is a block diagram illustrating a configuration example of a communication unit 251 in FIG. 11.

In the drawing, the same reference numerals are given to portions corresponding to the communication unit 201 in FIG. 7 and the description thereof will be appropriately omitted below.

The communication unit 251 is similar to the communication unit 201 in that the reception unit 72 is included.

However, the communication unit 251 is different from the communication unit 201 in FIG. 7 in that the transmission unit 261 is included instead of the transmission unit 211.

The communication unit 251 is different from the communication unit 201 in FIG. 7 in that a control unit 271 is newly installed.

As in the transmission unit 211 in FIG. 7, the transmission unit 261 performs the frequency conversion to convert the baseband signal (supplied from the USB host 10) into the modulated signal of the millimeter wave band and transmits the modulated signal (to the reception unit 82) via the millimeter wave connectors 52 and 62 serving as the waveguides.

The transmission unit 261 further includes the detection target mechanism 262. The detection target mechanism 262 is similar to the detection target mechanism 202 in FIG. 7 in that the detection target mechanism 262 is installed on a path through which the baseband signal is supplied from the USB host 10.

However, the detection target mechanism 262 is different from the detection target mechanism 202 in that the connection between the detection target mechanism 262 and the USB host 10 is configured to be controlled, as described with reference to FIG. 11.

The control unit 271 controls the connection between the detection target mechanism 262 and the USB host 10 according to a connection state between the USB host 10 and the USB device 20.

That is, the control unit 271 detects the connection (state) between the USB host 10 and the USB device 20.

When the connection between the USB host 10 and the USB device 20 is detected (the USB host 10 and the USB device 20 are connected), the control unit 271 (electrically) connects the detection target mechanism 262 to the USB host 10.

On the other hand, when disconnection between the USB host 10 and the USB device 20 is detected (the USB host 10 and the USB device 20 are not connected), the control unit 271 disconnects the detection target mechanism 262 from the USB host 10.

In the communication system in FIG. 11, when a device detecting the detection target mechanism and recognizing connection with a communication partner is used instead of the USB device 20 as in the USB host 10, a communication unit having the same configuration as the communication unit 251 is installed instead of the communication unit 63 in FIG. 12.

<Configuration Example of Control Unit 271>

Figure 13:
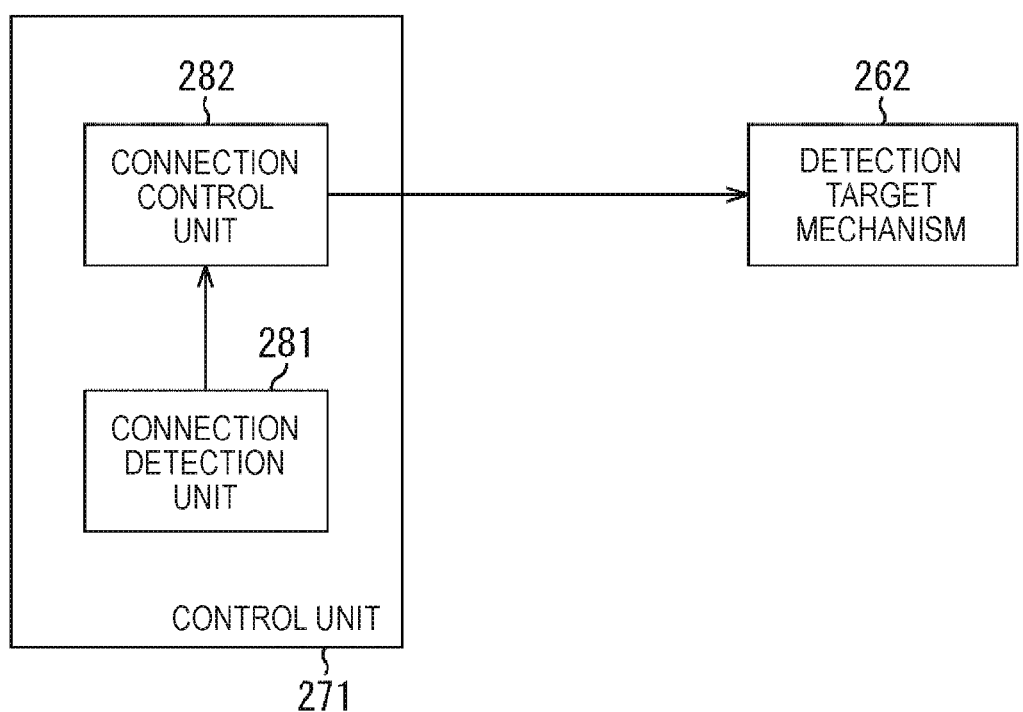
FIG. 13 is a block diagram illustrating a configuration example of a control unit 271.

FIG. 13 is a block diagram illustrating a configuration example of the control unit 271 in FIG. 12.

In FIG. 13, the control unit 271 includes a connection detection unit 281 and a connection control unit 282.

The connection detection unit 281 detects the connection (state) between the USB host 10 and the USB device 20 and supplies detection information indicating the detection result to the connection control unit 282.

The connection control unit 282 controls the connection between the detection target mechanism 262 and the USB host 10 according to the detection information from the connection detection unit 281.

That is, when the detection information indicates that the USB host 10 and the USB device 20 are connected, the connection control unit 282 controls the detection target mechanism 262 such that the detection target mechanism 262 is connected to the USB host 10.

On the other hand, when the detection information indicates that the USB host 10 and the USB device 20 are not connected, the connection control unit 282 controls the detection target mechanism 262 such that the detection target mechanism 262 is disconnected from the USB host 10 (the connection with the USB host 10 is released).

<Configuration Examples of Detection Target Mechanism 262 and Connection Detection Unit 281>

Figure 14:
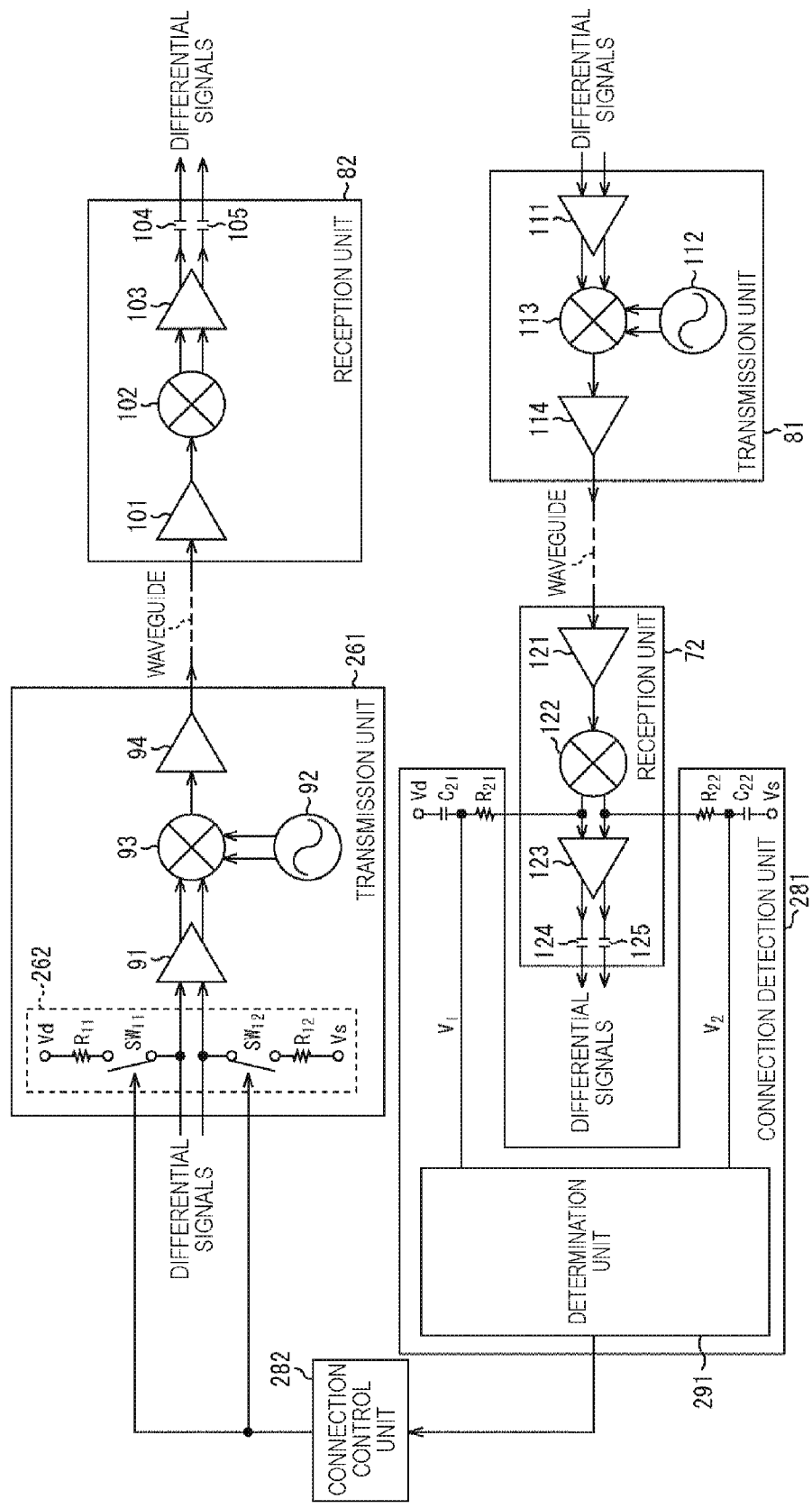
FIG. 14 is a diagram illustrating configuration examples of a detection target mechanism 262 and a connection detection unit 281.

FIG. 14 is a diagram illustrating configuration examples of the detection target mechanism 262 and the connection detection unit 281 in FIG. 13.

Here, as illustrated in FIG. 14, the transmission unit 261 is similar to the transmission unit 211 in FIG. 9 in that the amplifier 91, the oscillator 92, the mixer 93, and the amplifier 94 are included.

However, the transmission unit 261 is different from the transmission unit 211 in FIG. 9 in that a detection target mechanism 262 is included instead of the detection target mechanism 202.

The detection target mechanism 262 is similar to the detection target mechanism 202 in FIG. 9 in that the detection target mechanism 262 is configured to include resistors $R_{11}$ and $R_{12}$ serving as a common mode impedance, one end of each of the resistors $R_{11}$ and $R_{12}$ is connected to an input terminal of the amplifier 91 to which the differential signal which is the baseband signal is supplied from the USB host 10, and the other ends of the resistors $R_{11}$ and $R_{12}$ are connected to power supplies $V_d$ and $V_s$, respectively.

However, the detection target mechanism 262 is different from the detection target mechanism 202 in FIG. 9 in that a switch $SW_{11}$ is newly installed between the one end of the resistor $R_{11}$ and the input terminal to which the positive signal of the amplifier 91 is supplied and a switch $SW_{12}$ is newly installed between the one end of the resistor $R_{12}$ and the input terminal to which the negative signal of the amplifier 91 is supplied.

The switches $SW_{11}$ and $SW_{12}$ are turned on or off under the control of the connection control unit 282.

In FIG. 14, when the millimeter wave cable 200 (FIG. 6) is connected to the USB host 10 and the switches $SW_{11}$ and $SW_{12}$ are turned on, the USB host 10 and the detection target mechanism 262 are connected. Thus, the USB host 10 can detect the resistors $R_{11}$ and $R_{12}$ serving as the common mode impedance configuring the detection target mechanism 262

In FIG. 14, when the millimeter wave cable 200 (FIG. 6) is connected to the USB host 10 and the switches $SW_{11}$ and $SW_{12}$ are turned off, the USB host 10 is disconnected from the detection target mechanism 262. Therefore, the USB host 10 may not detect the resistors $R_{11}$ and $R_{12}$ serving as the common mode impedance configuring the detection target mechanism 262.

When the detection information from the connection detection unit 281 indicates that the USB host 10 and the USB device 20 are connected, the connection control unit 282 turns on the switches $SW_{11}$ and $SW_{12}$, connects the USB host 10 to the detection target mechanism 262, and allows the USB host 10 to detect the resistors $R_{11}$ and $R_{12}$ serving as the common mode impedance configuring the detection target mechanism 262.

When the detection information from the connection detection unit 281 indicates that the USB host 10 and the USB device 20 are not connected, the connection control unit 282 turns off the switches $SW_{11}$ and $SW_{12}$, disconnects the USB host 10 from the detection target mechanism 262, and allows the USB host 10 not to detect the resistors $R_{11}$ and $R_{12}$ serving as the common mode impedance configuring the detection target mechanism 262.

In FIG. 14, the connection detection unit 281 includes resistors $R_{21}$ and $R_{22}$, capacitors $C_{21}$ and $C_{22}$, and a determination unit 291.

One end of the resistor $R_{21}$ is connected to a terminal to which a positive signal which is one signal of the differential signals is output between two terminals to which the differential signals of the mixer 122 are output, and the other end thereof is connected to one end of the capacitor $C_{21}$. The other end of the capacitor $C_{21}$ is connected to a power supply $V_d$.

One end of the resistor $R_{22}$ is connected to a terminal to which a negative signal which is the other signal of the differential signals is output between the two terminals to which the differential signals of the mixer 122 are output, and the other end thereof is connected to one end of the capacitor $C_{22}$. The other end of the capacitor $C_{22}$ is connected to a power supply $V_s$.

The determination unit 291 is supplied with a voltage $V_1$ of a connection point of the resistors $R_{21}$ and the capacitor $C_{21}$ and a voltage $V_2$ of a connection point of the resistor $R_{22}$ and the capacitor $C_{22}$.

A direct-current (DC) offset of the positive signal between the differential signals appears at the connection point of the resistor $R_{21}$ and the capacitor $C_{21}$ and a DC offset of the negative signal between the differential signals appears at the connection point of the resistor $R_{22}$ and the capacitor $C_{22}$.

Accordingly, the voltage $V_1$ is the DC offset of the positive signal and the voltage $V_2$ is the DC offset of the negative signal.

The determination unit 291 detects a difference $V_1-V_2$ between the voltages $V_1$ and $V_2$ as power of the modulated signal received by the reception unit 72.

Here, when the USB host 10 and the USB device 20 are not connected via the millimeter wave cables 250 and 60, the reception unit 72 on the side of the USB host 10 may not receive the modulated signal from the transmission unit 81 on the side of the USB device 20 and the power of the modulated signal received by the reception unit 72 is 0 (including a value regarded to be 0). As a result, the DC offsets of the positive signal and the negative signal serving as the voltages $V_1$ and $V_2$ are (substantially) 0.

On the other hand, when the USB host 10 and the USB device 20 are connected via the millimeter wave cables 250 and 60, the modulated signal transmitted from the transmission unit 81 on the side of the USB device 20 is received by the reception unit 72 on the side of the USB host 10. The DC offsets of the positive signal and the negative signal serving as the voltages $V_1$ and $V_2$ have a magnitude corresponding to the power of the modulated signal from the transmission unit 81.

The determination unit 291 detects the difference $V_1-V_2$ between the DC offsets (voltages thereof) $V_1$ and $V_2$ of the positive signal and the negative signal which are the differential signals as the power of the modulated signal received by the reception unit 72.

Here, for example, when +a (>0) is assumed to be the DC offset $V_1$ of the positive signal, the DC offset $V_2$ of the negative signal is ideally −a. That is, the values of the DC offset $V_1$ of the positive signal and the DC offset $V_2$ of the negative signal ideally have the same magnitude and opposite signs.

Accordingly, the determination unit 291 can detect only one of the DC offset $V_1$ of the positive signal and the DC offset $V_2$ of the negative signal as the power of the modulated signal received by the reception unit 72.

As described above, however, the determination unit 291 can improve sensitivity of the detection of the power of the modulated signal by detecting the difference $V_1-V_2$ between the DC offsets $V_1$ and $V_2$ as the power of the modulated signal received by the reception unit 72, compared to the case in which only one of the DC offsets $V_1$ and $V_2$ is detected as the power of the modulated signal.

In FIG. 14, the connection detection unit 281 has been assumed to detect the power of the modulated signal received by the reception unit 72 using the output of the mixer 122 of the reception unit 72. The connection detection unit 281 can also detect the power of the modulated signal received by the reception unit 72, for example, using an output of the amplifier 123 or an output of the amplifier 121.

As described above, the determination unit 291 detects the difference $V_1-V_2$ between the DC offsets $V_1$ and $V_2$ as the power of the modulated signal received by the reception unit 72 and detects the connection state between the USB host 10 and the USB device 20 by determining whether the USB host 10 and the USB device 20 are connected, based on the power of the modulated signal Then, the determination unit 291 supplies the connection control unit 282 with the detection information indicating the detection result of the connection state between the USB host 10 and the USB device 20.

Figure 15:
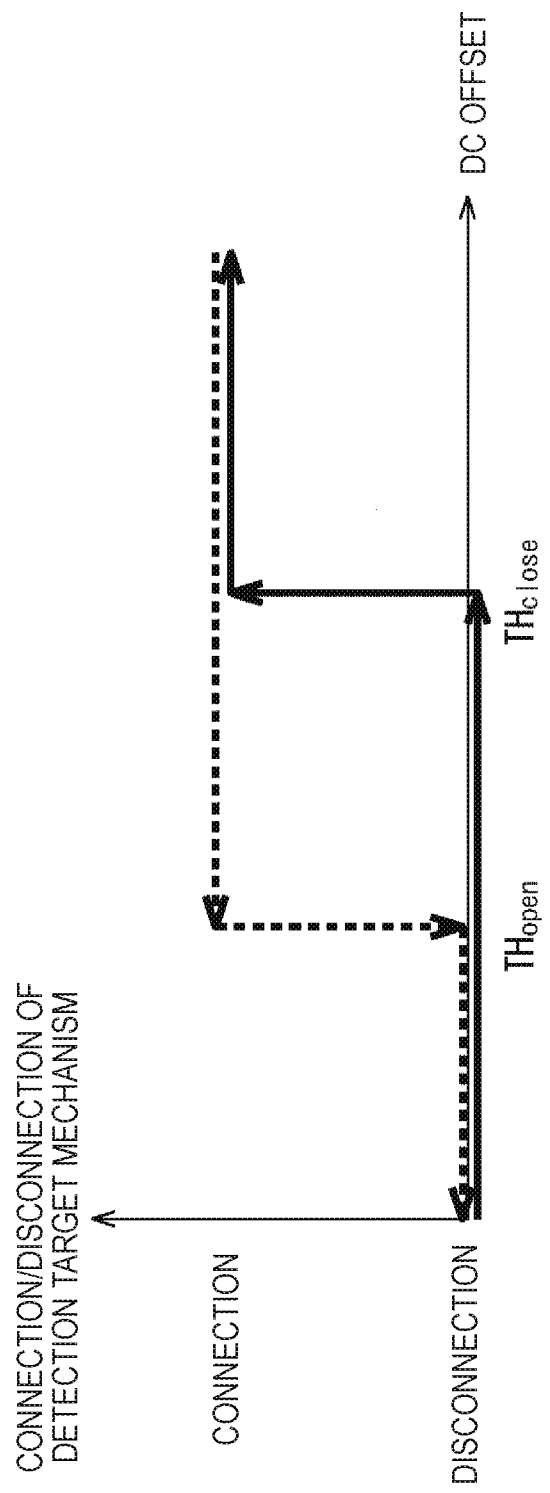
FIG. 15 is a diagram for describing an example of a process of detecting a connection state between the USB host 10 and a USB device 20 by a determination unit 291.

FIG. 15 is a diagram for describing an example of a process of detecting a connection state between the USB host 10 and the USB device 20 by the determination unit 291 in FIG. 14.

The determination unit 291 determines (detects) that the USB host 10 and the USB device 20 are connected when the power of the modulated signal is equal to or greater than (larger) than a predetermined threshold value, and thus the millimeter wave connectors 52 and 62 are connected and the modulated signal is recognized to be transmitted from the USB device 20 to the USB host 10.

Conversely, the determination unit 291 determines (detects) that the USB host 10 and the USB device 20 are not connected when the power of the modulated signal is equal to or less than (smaller) than the predetermined threshold value, and thus the connection between the millimeter wave connectors 52 and 62 is released and the modulated signal from the USB device 20 is recognized (determined) not to be received by the USB host 10.

Here, a connection threshold value $TH_{close}$ is assumed to a first threshold value when the determination unit 291 determines that the USB host 10 and the USB device 20 are connected and a disconnection threshold value $TH_{open}$ is assumed to be a second threshold value when the determination unit 291 determines that the USB host 10 and the USB device 20 are not connected.

Of the detection results of the connection state between the USB host 10 and the USB device 20 in the determination unit 291, the detection result indicating that the USB host 10 and the USB device 20 are connected is assumed to be a connection detection result and the detection result indicating that the USB host 10 and the USB device 20 are not connected is assumed to be a disconnection detection result.

Here, when the same predetermined threshold value is adopted as the connection threshold value $TH_{close}$ and the disconnection threshold value $TH_{open}$ and the power of the modulated signal is a value near the predetermined threshold value, the connection detection result and the disconnection detection result are often switched as the detection result of the connection state between the USB host 10 and the USB device 20. As a result, the switching of the connection and the disconnection between the USB host 10 and the detection target mechanism 262 often occurs in some cases.

Thus, different values having a relation in an expression "$Th_{close} > TH_{open}$" can be adopted as the connection threshold value $TH_{close}$ and the disconnection threshold value $TH_{open}$, as illustrated in FIG. 15, so that hysteresis can be given to the detection result of the connection state between the USB host 10 and the USB device 20, and consequently, to the connection and the disconnection between the USB host 10 and the detection target mechanism 262.

In this case, when the power of the modulated signal is equal to or greater than the connection threshold value $TH_{close}$, the connection detection result can be obtained as the detection result of the connection state between the USB host 10 and the USB device 20, and thus the detection target mechanism 262 is connected to the USB host 10.

Then, when the detection target mechanism 262 is connected to the USB host 10, the connection detection result can be obtained as the detection result of the connection state between the USB host 10 and the USB device 20 despite the fact that the power of the modulated signal is equal to or less than the connection threshold value $TH_{close}$. Thus, the detection target mechanism 262 is not disconnected, but remains connected to the USB host 10.

When the detection target mechanism 262 is connected to the USB host 10 and the power of the modulated signal is equal to or less than the disconnection threshold value $TH_{open}$ less than the connection threshold value $TH_{close}$, the disconnection detection result can be obtained as the detection result of the connection state between the USB host 10 and the USB device 20. Thus, the detection target mechanism 262 is disconnected from the USB host 10.

When the detection target mechanism 262 is disconnected from the USB host 10, the disconnection detection result can be obtained as the detection result of the connection state between the USB host 10 and the USB device 20 despite the fact that the power of the modulated signal is equal to or greater than the disconnection threshold value $TH_{open}$. Thus, the detection target mechanism 262 is not connected, but remains disconnected from the USB host 10.

When the detection target mechanism 262 is disconnected from the USB host 10 and the power of the modulated signal is equal to or greater than the connection threshold value $TH_{close}$ greater than the disconnection threshold value $TH_{open}$, the connection detection result can be obtained as the detection result of the connection state between the USB host 10 and the USB device 20. Thus, the detection target mechanism 262 is connected to the USB host 10.

As described above, by giving the hysteresis to the switching of the connection and the disconnection between the USB host 10 and the detection target mechanism 262, it is possible to prevent the switching of the connection and the disconnection between the USB host 10 and the detection target mechanism 262 from often occurring.

Figure 16:
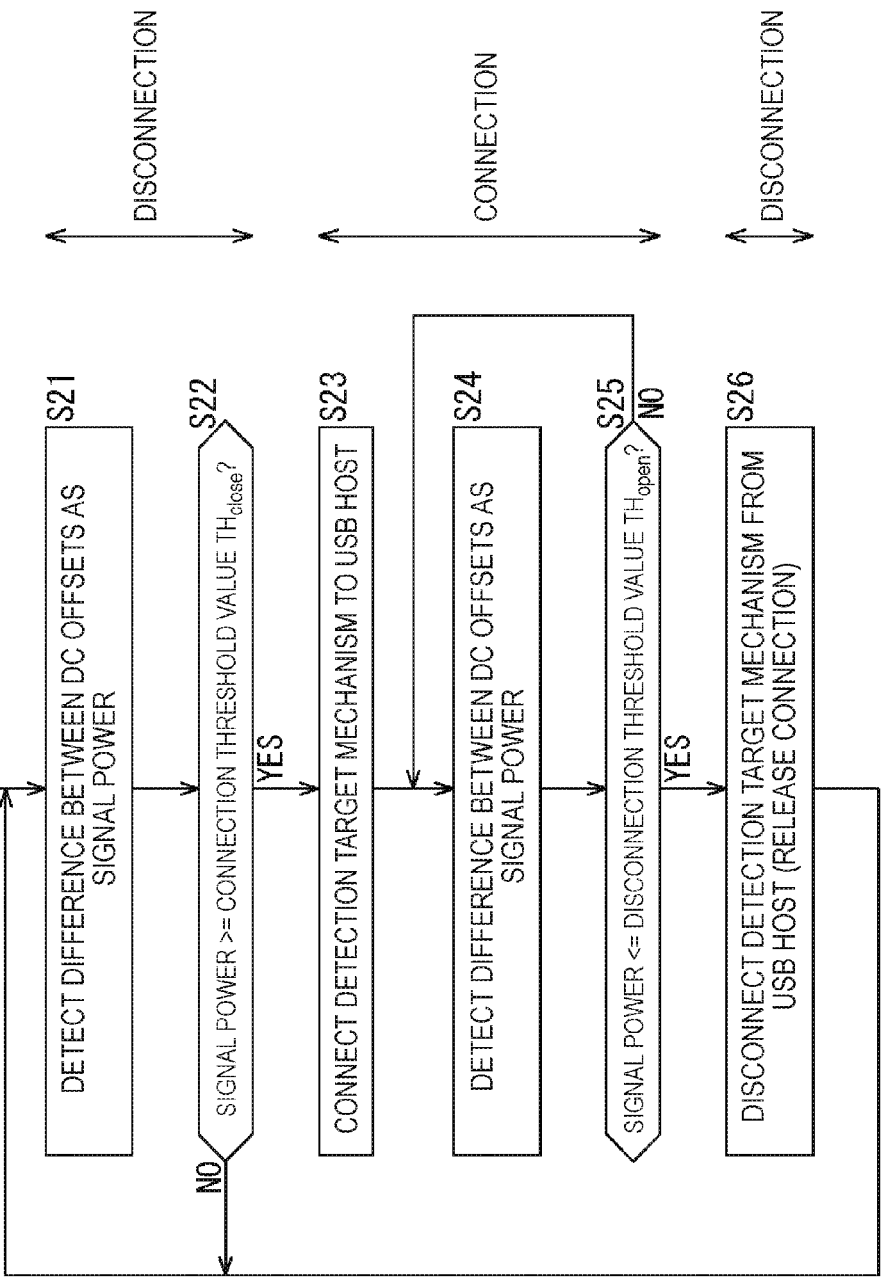
FIG. 16 is a flowchart for describing an example of an operation of the control unit 271.

FIG. 16 is a flowchart for describing an example of an operation of the control unit 271 (FIG. 13) when the connection detection unit 281 is configured as illustrated in FIG. 14.

Before start of the operation according to the flowchart of FIG. 16, the detection target mechanism 262 is assumed to be disconnected from the USB host 10.

In step S21, the determination unit 291 of the connection detection unit 281 detects, as the power of the modulated signal received by the reception unit 72, the difference $V_1-V_2$ between the DC offset $V_1$ of the positive signal and the DC offset $V_2$ of the negative signal of the differential signals which are output by the mixer 122 of the reception unit 72 and are the baseband signals obtained by performing the frequency conversion on the modulated signals of the millimeter wave band. Then, the process proceeds to step S22.

In step S22, the determination unit 291 determines whether the power (hereinafter also referred to as signal power) of the modulated signal is equal to or greater than the connection threshold value $TH_{close}$.

When it is determined in step S22 that the signal power is not equal to or greater than the connection threshold value $TH_{close}$, that is, the USB host 10 and the USB device 20 are not connected via the millimeter wave cables 250 and 60 and the modulated signal is not transmitted from the USB host 10 to the USB device 20, the process returns to step S21. Then, hereinafter, the same process is repeated.

Conversely, when it is determined in step S22 that the signal power is equal to or greater than the connection threshold value $TH_{close}$, that is, the USB host 10 and the USB device 20 are connected via the millimeter wave cables 250 and 60 and the modulated signal is transmitted from the USB host 10 to the USB device 20, the determination unit 291 supplies the detection information indicating the connection detection result to the connection control unit 282. Then, the process proceeds to step S23.

In step S23, the connection control unit 282 turns on the switches $SW_{11}$ and $SW_{12}$ (FIG. 14) according to the detection information from the determination unit 291 to connect the detection target mechanism 262 to the USB host 10. Then, the process proceeds to step S24.

When the detection target mechanism 262 is connected to the USB host 10, the USB host 10 detects the resistors $R_{11}$ and $R_{12}$ serving as the common mode impedance configuring the detection target mechanism 262. When the USB host 10 detects the resistors $R_{11}$ and $R_{12}$ serving as the common mode impedance, the USB host 10 recognizes (detects) the connection with the USB device 20 and starts outputting the baseband signal as the polling.

Then, when the USB device 20 responds to the polling from the USB host 10, the connection is established between the USB host 10 and the USB device 20 so that the data can be transmitted.

In step S24, the determination unit 291 of the connection detection unit 281 detects the power of the modulated signal received by the reception unit 72, as in step S21. Then, the process proceeds to step S25.

In step S25, the determination unit 291 determines whether the power (the signal power) of the modulated signal is equal to or less than the disconnection threshold value $TH_{open}$.

When it is determined in step S25 that the signal power is not equal to or less than the disconnection threshold value $TH_{open}$, that is, for example, the modulated signal from the USB device 20 (the transmission unit 81 on the side of the USB device 20) can be received by the USB host 10 (the reception unit 72 on the side of the USB host 10) without the releasing of the connection between the millimeter wave connectors 52 and 62, the process returns to step S24. Hereinafter, the same processes are repeated.

Conversely, when it is determined in step S25 that the signal power is equal to or less than the disconnection threshold value $TH_{open}$, that is, for example, the connection between the millimeter wave connectors 52 and 62 is released and the modulation signal from the USB device 20 may not be received by the USB host 10, the determination unit 291 supplies the connection control unit 282 with the detection information indicating the disconnection detection result. Then, the process proceeds to step S26.

In step S26, the connection control unit 282 disconnects the detection target mechanism 262 from the USB host 10 by turning off the switches $SW_{11}$ and $SW_{12}$ (FIG. 14) according to the detection information from the determination unit 291, and then the process returns to step S21. Hereinafter, the same processes are repeated.

Since the detection target mechanism 262 is disconnected from the USB host 10, the USB host 10 may not detect the resistors $R_{11}$ and $R_{12}$ (FIG. 14) serving as the common mode impedance configuring the detection target mechanism 262. Thus, the USB host 10 recognizes (detects) the non-connection with the USB device 20 and stops outputting the baseband signal.

Accordingly, it is possible to prevent the power from being unnecessarily consumed due to a continuous output of the baseband signal despite the fact that the USB host 10 is not connected to the USB device 20.

Here, when the processes of steps S21, S22, and S26 in FIG. 16 are performed, the detection target mechanism 262 is in the disconnection state from the USB host 10. When the processes of step S23 to S25 are performed, the detection target mechanism 262 is in the connection state with the USB host 10.

In the communication system in FIG. 11, the connection detection unit 281 (FIG. 13) has detected the connection state between the USB host 10 and the USB device 20 based on the power of the modulated signal on the implicit assumption that the transmission unit 81 (FIG. 12) on the side of the USB device 20 transmits the modulated signal when the USB host 10 and the USB device 20 are connected. However, a method of detecting the connection state between the USB host 10 and the USB device 20 is not limited thereto.

That is, the millimeter wave connector 52 or 62 can be provided with a mechanical mechanism which is in different states when the connection is established between the millimeter wave connectors 52 and 62 and when the connection is released, and the connection state between the USB host 10 and the USB device 20 can be detected based on the state of the mechanical mechanism.

In this case, when the USB host 10 and the USB device 20 are connected, the communication units 251 and 63 (FIG. 12) can be operated. When the USB host 10 and the USB device 20 are not connected, power consumption can be reduced by stopping the operations of the communication units 251 and 63.

<Communication System of Third Embodiment to which the Present Technology is Applied>

Figure 17:
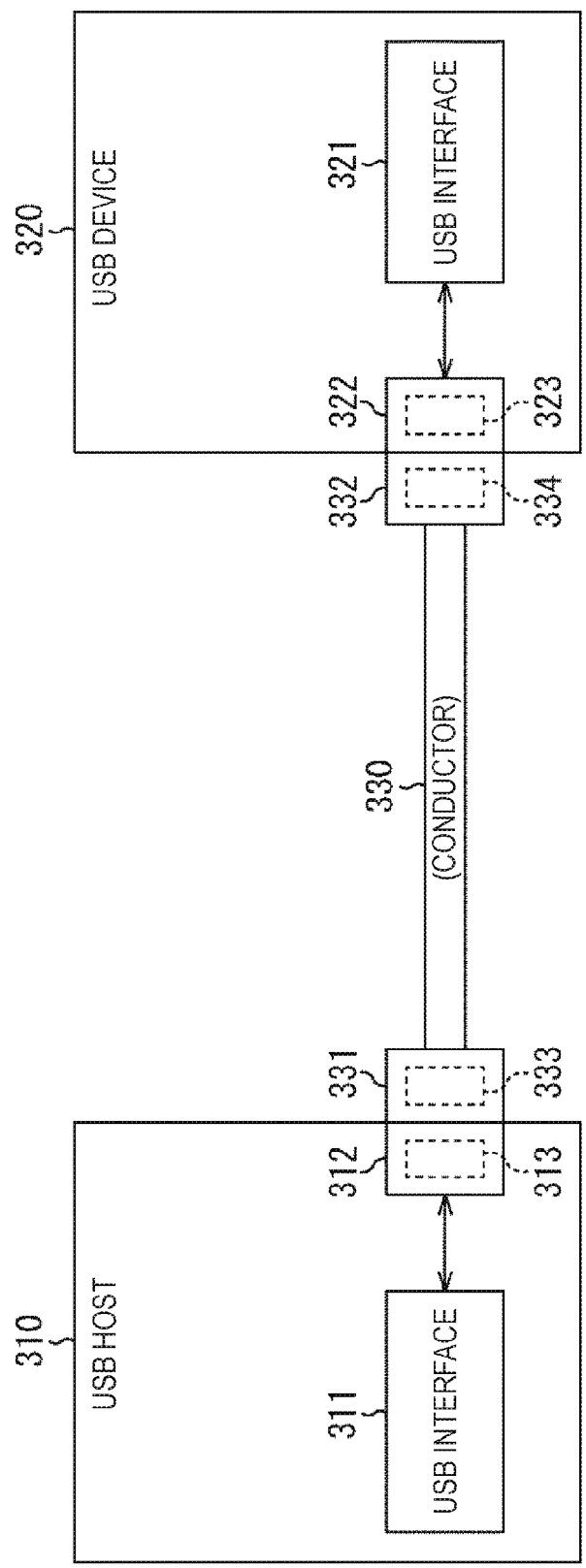
FIG. 17 is a diagram illustrating a configuration example of a communication system of a third embodiment to which the present technology is applied.

FIG. 17 is a diagram illustrating a configuration example of a communication system of a third embodiment to which the present technology is applied.

In the communication system in FIG. 17, a USB host 310 and a USB device 320 are connected by a millimeter wave correspondence electric cable 330.

The USB host 310 is an electronic device that has a function of a USB host similar to the USB host 10 and includes a USB interface 311 and a millimeter wave connector 312.

The USB interface 311 is an interface that controls data transmission by a USB and is connected to the millimeter wave connector 312 (a communication unit 313 included in the millimeter wave connector 312).

As in the millimeter wave connector 52 and 62 (FIGS. 6 and 11), the millimeter wave connector 312 is formed of a material such as a dielectric serving as a waveguide transmitting a modulated signal of a millimeter wave band and includes the communication unit 313.

The communication unit 313 has the same configuration as that of the communication unit 201 (FIG. 6) or the communication unit 251 (FIG. 11). The communication unit 313 can perform transmission and reception of a baseband signal to and from the USB interface 311 and perform transmission and reception of a modulated signal of a millimeter wave band to and from a communication unit 333 via the millimeter wave connector 312 and a millimeter wave connector 331 serving as waveguides.

The USB device 320 is an electronic device that has a function of a USB device similar to the USB device 20 and includes a USB interface 321 and a millimeter wave connector 322.

The USB interface 321 is an interface that controls data transmission by a USB and is connected to the millimeter wave connector 322 (a communication unit 323 included in the millimeter wave connector 322).

As in the millimeter wave connector 52 and 62 (FIGS. 6 and 11), the millimeter wave connector 322 is formed of a material such as a dielectric serving as a waveguide transmitting a modulated signal of a millimeter wave band and includes the communication unit 323.

For example, the communication unit 323 has the same configuration as that the communication unit 63 (FIG. 6 or 11). The communication unit 323 can perform transmission and reception of a baseband signal to and from the USB interface 321 and perform transmission and reception of a modulated signal of a millimeter wave band to and from a communication unit 334 via the millimeter wave connector 322 and a millimeter wave connector 332 serving as waveguides.

The millimeter wave correspondence electric cable 330 is a cable in which the millimeter wave connector 331 engaging with the millimeter wave connector 312 of the USB host 310 is installed at one end and the millimeter wave connector 332 engaging with the millimeter wave connector 322 of the USB device 320 is installed at the other end, and a core wire is a conductor.

The millimeter wave connectors 331 and the 332 are formed of a material such as a dielectric serving as a waveguide transmitting a modulated signal of a millimeter wave band, as in the millimeter wave connectors 52 and 62 (FIGS. 6 and 11). The millimeter wave connector 331 includes the communication unit 333 and the millimeter wave connector 332 includes the communication unit 334.

The communication unit 333 has the same configuration as, for example, the communication unit 63 (FIG. 6 or 11). The communication unit 333 performs transmission and reception of a modulated signal of a millimeter wave band to and from the communication unit 313 via the millimeter wave connectors 331 and 312 serving as the waveguides and performs transmission and reception of a baseband signal to and from the communication unit 334 via the conductor which is the core wire of the millimeter wave correspondence electric cable 330.

The communication unit 334 has the same configuration as, for example, the communication unit 53 (FIG. 3). The communication unit 334 performs transmission and reception of a modulated signal of a millimeter wave band to and from the communication unit 323 via the millimeter wave connectors 332 and 322 serving as the waveguides and performs transmission and reception of a baseband signal to and from the communication unit 333 via the conductor which is the core wire of the millimeter wave correspondence electric cable 330.

In FIG. 17, the millimeter wave connector 331 of the millimeter wave correspondence electric cable 330 is connected to the millimeter wave connector 312 of the USB host 310 and the millimeter wave connector 332 of the millimeter wave correspondence electric cable 330 is connected to the millimeter wave connector 322 of the USB device 320, so that the USB host 310 and the USB device 320 are connected via the millimeter wave correspondence electric cable 330.

Then, an exchange of the modulated signal between the communication units 313 and 333 is performed, an exchange of the baseband signal between the communication units 333 and 334 and an exchange of the modulated signal between the communication units 334 and 323 are performed, so that data transmission by the baseband signal is performed between the USB interface 311 of the USB host 310 and the USB interface 321 of the USB device 320.

The millimeter wave connectors 312, 322, 331, and 332 in FIG. 17 can be formed of a nonmetal, as in the millimeter wave connectors 52 and 62. In this case, waterproof or dustproof countermeasures can be performed more easily than in connectors formed of a metal. Thus, the degree of design freedom can be improved without consideration of deterioration in a contact point caused due to insertion and extraction.

Here, to perform the data transmission between the USB host 10 and the USB device 20 in the communication system in FIG. 6 or 11, it is necessary for two millimeter wave cables 200 (or 250) and 60 to connect the USB host 10 to the USB device 20.

In the communication system in FIG. 6 or 11, it is not necessary to install the millimeter wave connectors such as the millimeter wave connectors 312 and 322 in the USB host 10 and the USB device 20, as in the case of FIG. 17.

On the other hand, in the communication system in FIG. 17, it is necessary to install the millimeter wave connector 312 in the USB host 310 and it is necessary to install the millimeter wave connector 322 in the USB device 320.

Here, to perform the data transmission between the USB host 310 and the USB device 320 in the communication system in FIG. 17, the USB host 310 and the USB device 320 can be connected with one millimeter wave correspondence electric cable 330.

Further, in the communication system in FIG. 17, it is possible to obtain, for example, the advantage in which it is easy to perform waterproof or dustproof countermeasures in both of a connection portion between the USB host 310 and the millimeter wave correspondence electric cable 330 and a connection portion between the USB device 320 and the millimeter wave correspondence electric cable 330.

<Communication System of Fourth Embodiment to which the Present Technology is Applied>

Figure 18:
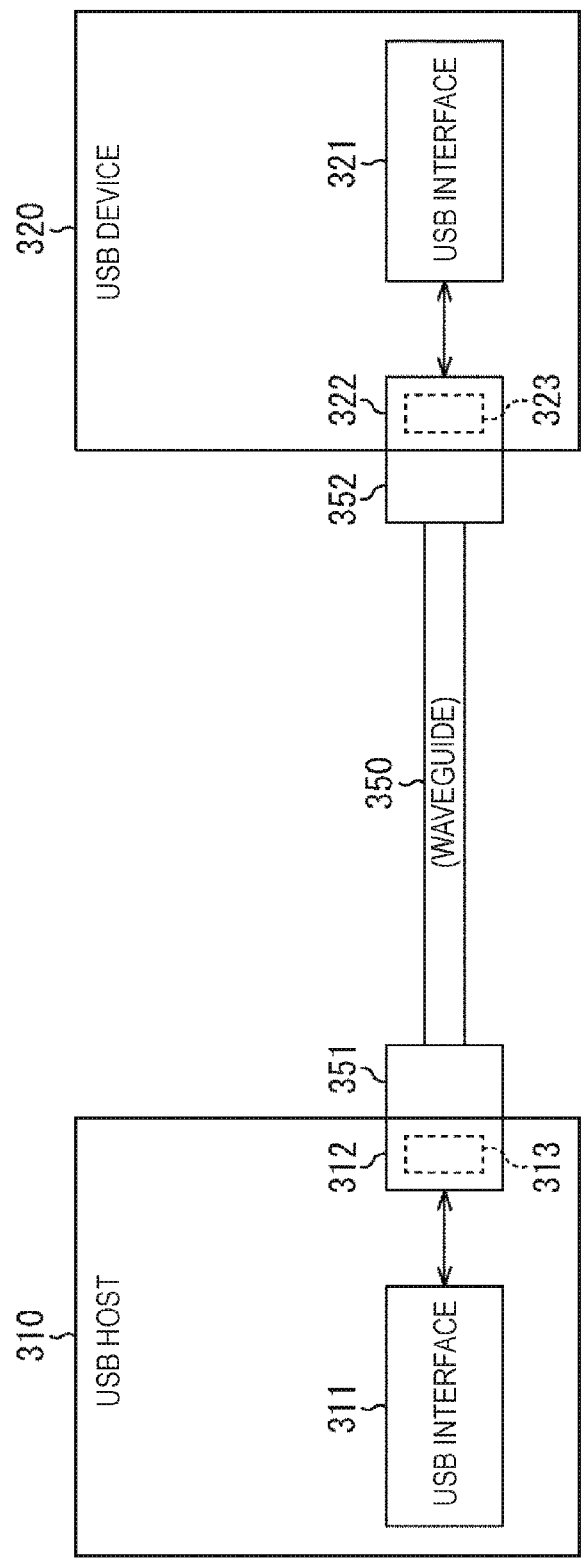
FIG. 18 is a diagram illustrating a configuration example of a communication system of a fourth embodiment to which the present technology is applied.

FIG. 18 is a diagram illustrating a configuration example of a communication system of a fourth embodiment to which the present technology is applied.

In the drawing, the same reference numerals are given to portions corresponding to the case of FIG. 17 and the description thereof will be appropriately omitted.

The communication system in FIG. 18 is similar to the case of FIG. 17 in that the USB host 310 and the USB device 320 are included. However, the communication system is different from the case of FIG. 17 in that a millimeter wave transmission cable 350 is installed instead of the millimeter wave correspondence electric cable 330.

The millimeter wave transmission cable 350 is a cable in which a waveguide transmitting a modulated signal of a millimeter wave band is a core wire. A millimeter wave connector 351 engaging with the millimeter wave connector 312 of the USB host 310 is installed at one end of the millimeter wave transmission cable 350 and a millimeter wave connector 352 engaging with the millimeter wave connector 322 of the USB device 320 is installed at the other end thereof.

The millimeter wave connectors 351 and 352 are formed of a material such as a dielectric serving as a waveguide transmitting the modulated signal of the millimeter wave band, as in the millimeter wave connectors 52 and 62 (FIGS. 6 and 11).

Accordingly, the entire millimeter wave transmission cable 350 (a length between the millimeter wave connectors 351 and 352) serves as a waveguide transmitting the modulated signal of the millimeter wave band.

In FIG. 18, the millimeter wave connector 351 of the millimeter wave transmission cable 350 is connected to the millimeter wave connector 312 of the USB host 310 and the millimeter wave connector 352 of the millimeter wave transmission cable 350 is connected to the millimeter wave connector 322 of the USB device 320, so that the USB host 310 and the USB device 320 are connected via the millimeter wave transmission cable 350.

Then, an exchange of the modulated signal of the millimeter wave band is performed between the communication units 313 and 323 via the millimeter wave transmission cable 350 which is the waveguide, so that the data transmission by the baseband signal is performed between the USB interface 311 of the USB host 310 and the USB interface 321 of the USB device 320.

In the communication system in FIG. 18, the same advantages as the case of FIG. 17 can also be obtained.

<Communication System of Fifth Embodiment to which the Present Technology is Applied>

Figure 19:
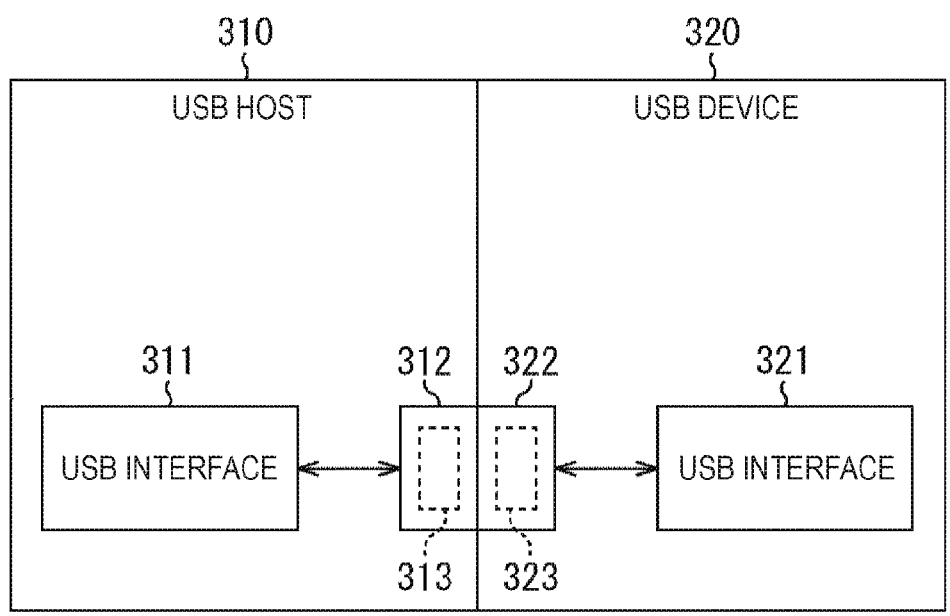
FIG. 19 is a diagram illustrating a configuration example of a communication system of a fifth embodiment to which the present technology is applied.

FIG. 19 is a diagram illustrating a configuration example of a communication system of a fifth embodiment to which the present technology is applied.

In the drawing, the same reference numerals are given to portions corresponding to the case of FIG. 17 and the description thereof will be appropriately omitted.

The communication system in FIG. 19 is similar to the case of FIG. 17 in that the USB host 310 and the USB device 320 are included. However, the communication system is different from the case of FIG. 17 in that the millimeter wave correspondence electric cable 330 is not installed.

The millimeter wave connector 312 of the USB host 310 and the millimeter wave connector 322 of the USB device 320 can also be configured to engage directly with each other in addition to the configuration of engagement with the millimeter wave connectors 331 and 332 (or the millimeter wave connectors 351 and 352 of the millimeter wave transmission cable 350) of the millimeter wave correspondence electric cable 330

In FIG. 19, for example, the millimeter wave connector 312 of the USB host 310 is connected directly to the millimeter wave connector 322 of the USB device 320, as in a case in which a USB memory serving as a USB device is connected directly to a personal computer (PC) serving as a USB host.

Then, an exchange of the modulated signal of the millimeter wave band is performed between the communication unit 313 included in the millimeter wave connector 312 and the communication unit 323 included in the millimeter wave connector 322 via the millimeter wave connectors 312 and 322 serving as the waveguides, so that the data transmission by the baseband signal is performed between the USB interface 311 of the USB host 310 and the USB interface 321 of the USB device 320.

In the communication system in FIG. 19, the same advantages as the case of FIG. 17 can also be obtained.

An embodiment of the disclosure is not limited to the embodiments described above, and various changes and modifications may be made without departing from the scope of the disclosure.

In the embodiment, for example, the signal of the millimeter wave band has been adopted as the modulated signal. However, a signal with a frequency band lower or higher than a millimeter wave can be adopted as the modulated signal.

In the embodiment, the case in which an embodiment of the present technology is applied to the electronic devices (the communication system including the electronic devices) conforming to the USB standard has been described. However, an embodiment of the present technology can be applied to electronic devices adopting a scheme of detecting a communication partner (connecting with a communication partner) using a detection target mechanism included in the communication partner, as in electronic devices including, for example, PCI Express as an interface, in addition to the electronic devices conforming to the USB standard.

In the communication system in FIG. 6, the communication unit 201 has been included in the millimeter wave connector 52. However, the communication unit 201 can be included at any position of the millimeter wave cable 200 on the condition that a waveguide transmitting the modulated signal is formed with the communication unit 63. The communication unit 63 can also be included at any position of the millimeter wave cable 60 rather than the millimeter wave connector 62 on the condition that a waveguide transmitting the modulated signal is formed with the communication unit 201. The same also applies to the communication system in FIG. 11.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

In addition, the effects described in the present specification are not limiting but are merely examples, and there may be additional effects.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A communication device including:

a transmission unit configured to transmit a modulated signal obtained by performing frequency conversion to convert a baseband signal output by a first electronic device into a signal with a higher frequency band than the baseband signal, using a waveguide as a transmission path; and a detection target mechanism corresponding to a mechanism included in a second electronic device that receives the baseband signal output by the first electronic device, the detection target mechanism being configured to be connected to the first electronic device and to be detected by the first electronic device when the first electronic device and the second electronic device are connected.

(2) The communication device according to (1), further including:

a control unit configured to control connection between the detection target mechanism and the first electronic device according to a connection state between the first electronic device and the second electronic device.

(3) The communication device according to (2), further including:

a connection detection unit configured to detect connection between the first electronic device and the second electronic device, wherein the control unit connects the detection target mechanism to the first electronic device when the connection between the first electronic device and the second electronic device is detected, and wherein the control unit disconnects the detection target mechanism from the first electronic device when disconnection between the first electronic device and the second electronic device is detected.

(4) The communication device according to (3), wherein the connection detection unit detects power of a modulated signal transmitted from another communication device that transmits the modulated signal obtained by performing the frequency conversion on a baseband signal output by the second electronic device, and detects the connection between the first electronic device and the second electronic device based on the power.

(5) The communication device according to (4), further including:
a reception unit configured to receive the modulated signal transmitted from the other communication device and perform the frequency conversion to convert the modulated signal into the baseband signal,
wherein the connection detection unit detects the power of the modulated signal using the baseband signal obtained by performing the frequency conversion on the modulated signal transmitted from the other communication device.
(6) The communication device according to (5), wherein the connection detection unit detects a direct current (DC) offset of the baseband signal obtained by performing the frequency conversion on the modulated signal transmitted from the other communication device as the power of the modulated signal.
(7) The communication device according to (6),
wherein the reception unit outputs a differential signal as the baseband signal obtained by performing the frequency conversion on the modulated signal transmitted from the other communication device, and
wherein the connection detection unit detects a difference in the DC offset of the differential signal as the power of the modulated signal.
(8) The communication device according to any one of (4) to (7),
wherein the connection detection unit determines that the first electronic device and the second electronic device are connected, when the power of the modulated signal is equal to or greater than a first threshold value, and
wherein the connection detection unit determines that the first electronic device and the second electronic device are disconnected, when the power of the modulated signal is equal to or less than a second threshold value less than the first threshold value.
(9) The communication device according to any one of (1) to (8), wherein the detection target mechanism is configured as a common mode impedance.
(10) The communication device according to any one of (1) to (9), wherein the modulated signal is a signal of a millimeter wave band.
(11) A control method including:
causing, by a communication device, a first electronic device to detect a detection target mechanism, the communication device including a transmission unit configured to transmit a modulated signal obtained by performing frequency conversion to convert a baseband signal output by the first electronic device into a signal with a higher frequency band than the baseband signal, using a waveguide as a transmission path, and the detection target mechanism corresponding to a mechanism included in a second electronic device that receives the baseband signal output by the first electronic device, the detection target mechanism being configured to be connected to the first electronic device and to be detected by the first electronic device when the first electronic device and the second electronic device are connected.
(12) A communication device including:
a transmission unit configured to transmit a modulated signal obtained by performing frequency conversion to convert a baseband signal output by a first electronic device into a signal with a higher frequency band than the baseband signal, using a waveguide as a transmission path;
a detection target mechanism corresponding to a mechanism included in a second electronic device that receives the baseband signal output by the first electronic device, the detection target mechanism being configured to be connected to the first electronic device and to be detected by the first electronic device when the first electronic device and the second electronic device are connected; and
a reception unit configured to receive a modulated signal transmitted from another communication device that transmits the modulated signal obtained by performing the frequency conversion on a baseband signal output by the second electronic device and to perform the frequency conversion to convert the modulated signal into the baseband signal.

What is claimed is:

1. A communication device comprising:
a transmission circuitry configured to
convert a frequency of a baseband signal that is output by a first electronic device into a modulated signal having a frequency that is higher than the frequency of the baseband signal, and
transmit the modulated signal using a waveguide as a transmission path;
a detection target circuitry corresponding to a mechanism included in a second electronic device that receives the baseband signal that is output by the first electronic device, the detection target circuitry configured to
connect to the first electronic device, and
emulate the mechanism included in the second electronic device to cause the first electronic device to detect a connection between the first electronic device and the second electronic device;
a control circuitry configured to control a connection between the detection target circuitry and the first electronic device according to a connection state between the first electronic device and the second electronic device; and
a connection detection circuitry configured to detect the connection between the first electronic device and the second electronic device,
wherein the control circuitry is further configured to
control the detection target circuitry to connect to the first electronic device when the connection between the first electronic device and the second electronic device is detected by the connection detection circuitry, and
control the detection target circuitry to disconnect from the first electronic device when a disconnection between the first electronic device and the second electronic device is detected by the connection detection circuitry.

2. The communication device according to claim 1, wherein the detection target circuitry is configured as a common mode impedance.

3. The communication device according to claim 1, wherein the modulated signal is a signal of a millimeter wave band.

4. A communication device comprising:
a transmission circuitry configured to transmit a modulated signal obtained by performing frequency conversion to convert a baseband signal that is output by a first electronic device into the modulated signal with a higher frequency band than the baseband signal, using a waveguide as a transmission path; and
a detection target circuitry corresponding to a mechanism included in a second electronic device that receives the baseband signal that is output by the first electronic device, the detection target circuitry configured to
connect to the first electronic device, and
cause detection of a connection between the first electronic device and the second electronic device;

a control circuitry configured to control a connection between the detection target circuitry and the first electronic device according to a connection state between the first electronic device and the second electronic device; and a connection detection circuitry configured to detect the connection between the first electronic device and the second electronic device, wherein the control circuitry is further configured to
connect the detection target circuitry to the first electronic device when the connection between the first electronic device and the second electronic device is detected, and
disconnect the detection target circuitry from the first electronic device when disconnection between the first electronic device and the second electronic device is detected, and wherein the connection detection circuitry is further configured to
detect power of a second modulated signal transmitted from a second communication device that transmits the second modulated signal obtained by performing a second frequency conversion on a second baseband signal that is output by the second electronic device, and
detect the connection between the first electronic device and the second electronic device based on the power of the second modulated signal.

5. The communication device according to claim 4, further comprising:
a reception circuitry configured to
receive the second modulated signal transmitted from the second communication device, and
perform a third frequency conversion to convert the second modulated signal into a third baseband signal,
wherein the connection detection circuitry is further configured to detect the power of the second modulated signal using the third baseband signal obtained by performing the third frequency conversion on the second modulated signal transmitted from the second communication device.

6. The communication device according to claim 5, wherein the connection detection circuitry is further configured to detect a direct current (DC) offset of the second baseband signal obtained by performing the third frequency conversion on the second modulated signal transmitted from the second communication device as the power of the second modulated signal.

7. The communication device according to claim 6,
wherein the reception circuitry is further configured to output a differential signal as the second baseband signal obtained by performing the third frequency conversion on the second modulated signal transmitted from the second communication device, and
wherein the connection detection circuitry is further configured to detect a difference in the DC offset of the differential signal as the power of the second modulated signal.

8. The communication device according to claim 4, wherein the connection detection circuitry is further configured to
determine that the first electronic device and the second electronic device are connected when the power of the second modulated signal is equal to or greater than a first threshold value, and
determine that the first electronic device and the second electronic device are disconnected when the power of the second modulated signal is equal to or less than a second threshold value less than the first threshold value.

9. The communication device according to claim 4, wherein the detection target circuitry is configured as a common mode impedance.

10. The communication device according to claim 4, wherein the modulated signal is a signal of a millimeter wave band.

11. A communication method comprising:
connecting a communication device to a first electronic device, the communication device including a detection target circuitry corresponding to a mechanism included in a second electronic device;
detecting, with a connection detection circuitry, a connection between the first electronic device and the second electronic device;
controlling, with a control circuitry, the detection target circuitry to connect to the first electronic device when the connection between the first electronic device and the second electronic device is detected by the connection detection circuitry;
emulating, with the detection target circuitry, the mechanism included in the second electronic device to cause the first electronic device to detect the connection between the first electronic device and the second electronic device;
converting, with a transmission circuitry of the communication device, a frequency of a baseband signal that is output by the first electronic device into a modulated signal having a frequency that is higher than the frequency of the baseband signal; and
transmitting, with the transmission circuitry, the modulated signal to the second electronic device using a waveguide as a transmission path.

12. A communication system comprising:
a first electronic device; and
a communication device connected to the first electronic device, the communication device including
a transmission circuitry configured to
convert a frequency of a first baseband signal that is output by the first electronic device into a first modulated signal having a frequency that is higher than the frequency of the first baseband signal, and
transmit the first modulated signal using a waveguide as a transmission path;
a detection target circuitry corresponding to a mechanism included in a second electronic device that receives the first baseband signal that is output by the first electronic device, the detection target circuitry configured to
connect to the first electronic device, and
emulate the mechanism included in the second electronic device to cause the first electronic device to detect a connection between the first electronic device and the second electronic device; and
a reception circuitry configured to
receive a second modulated signal transmitted from a second communication device, wherein the second modulated signal is obtained by performing a second frequency conversion on a second baseband signal output by the second electronic device, and
convert the second modulated signal into a second baseband signal;

a control circuitry configured to control a connection between the detection target circuitry and the first electronic device according to a connection state between the first electronic device and the second electronic device; and a connection detection circuitry configured to detect the connection between the first electronic device and the second electronic device, wherein the control circuitry is further configured to
control the detection target circuitry to connect to the first electronic device when the connection between the first electronic device and the second electronic device is detected by the connection detection circuitry, and control the detection target circuitry to disconnect from the first electronic device when a disconnection between the first electronic device and the second electronic device is detected by the connection detection circuitry.

13. A communication system comprising:
a first electronic device; and
a communication device connected to the first electronic device, the communication device including
a transmission circuitry configured to transmit a first modulated signal obtained by performing a first frequency conversion to convert a first baseband signal that is output by the first electronic device into the first modulated signal with a higher frequency band than the first baseband signal, using a waveguide as a transmission path;

a detection target circuitry corresponding to a mechanism included in a second electronic device that receives the first baseband signal that is output by the first electronic device, the detection target circuitry configured to
connect to the first electronic device, and
cause detection of a connection between the first electronic device and the second electronic device;

a reception circuitry configured to
receive a second modulated signal transmitted from a second communication device that transmits the second modulated signal obtained by performing a second frequency conversion on a second baseband signal output by the second electronic device, and
perform a third frequency conversion to convert the second modulated signal into a second baseband signal;

a control circuitry configured to control a connection between the detection target circuitry and the first electronic device according to a connection state between the first electronic device and the second electronic device; and a connection detection circuitry configured to detect the connection between the first electronic device and the second electronic device, wherein the control circuitry is further configured to
connect the detection target circuitry to the first electronic device when the connection between the first electronic device and the second electronic device is detected by the connection detection circuitry, and
disconnect the detection target circuitry from the first electronic device when disconnection between the first electronic device and the second electronic device is detected by the connection detection circuitry, and wherein the connection detection circuitry is further configured to
detect power of the second modulated signal transmitted from the second communication device that transmits the second modulated signal obtained by performing the second frequency conversion on the second baseband signal that is output by the second electronic device, and
detect the connection between the first electronic device and the second electronic device based on the power of the second modulated signal.

14. The communication system according to claim 13, wherein the connection detection circuitry is further configured to detect a direct current (DC) offset of the second baseband signal obtained by performing the third frequency conversion on the second modulated signal transmitted from the second communication device as the power of the second modulated signal.

15. The communication system according to claim 14, wherein the reception circuitry is further configured to output a differential signal as the second baseband signal obtained by performing the third frequency conversion on the second modulated signal transmitted from the second communication device, and
wherein the connection detection circuitry is further configured to detect a difference in the DC offset of the differential signal as the power of the second modulated signal.

16. The communication system according to claim 13, wherein the connection detection circuitry is further configured to
determine that the first electronic device and the second electronic device are connected when the power of the second modulated signal is equal to or greater than a first threshold value, and
determine that the first electronic device and the second electronic device are disconnected when the power of the second modulated signal is equal to or less than a second threshold value less than the first threshold value.

17. The communication system according to claim 13, wherein the detection target circuitry is configured as a common mode impedance.

18. The communication system according to claim 13, wherein the first modulated signal is a signal of a millimeter wave band.

19. The communication method according to claim 11, further comprising controlling, with the control circuitry, the detection target circuitry to disconnect from the first electronic device when the connection between the first electronic device and the second electronic device is not detected by the connection detection circuitry.

20. The communication method according to claim 11, wherein the detection target circuitry is configured as a common mode impedance.

21. The communication method according to claim 11, wherein the modulated signal is a signal of a millimeter wave band.

22. The communication system according to claim 12, wherein the detection target circuitry is configured as a common mode impedance.

23. The communication system according to claim 12, wherein the first modulated signal is a signal of a millimeter wave band.

\* \* \* \* \*